US012562947B2

(12) United States Patent
Liu et al.

(10) Patent No.: US 12,562,947 B2
(45) Date of Patent: Feb. 24, 2026

(54) GLUE REFERENCE SIGNALS FOR JOINT CHANNEL ESTIMATION ACROSS A PHASE JUMP BOUNDARY

(71) Applicant: QUALCOMM Incorporated, San Diego, CA (US)

(72) Inventors: Chih-Hao Liu, San Diego, CA (US); Jing Sun, San Diego, CA (US); Morteza Soltani, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 18/779,924

(22) Filed: Jul. 22, 2024

(65) Prior Publication Data

US 2026/0025298 A1 Jan. 22, 2026

(51) Int. Cl.
| | |
|---|---|
| *H04K 1/10* | (2006.01) |
| *H04L 5/00* | (2006.01) |
| *H04L 27/26* | (2006.01) |

(52) U.S. Cl.
CPC .......... *H04L 27/261* (2013.01); *H04L 5/0048* (2013.01)

(58) Field of Classification Search
CPC ............................ H04L 27/261; H04L 5/0048
USPC ................ 375/260, 259, 261, 219, 295, 316
See application file for complete search history.

(56) References Cited

U.S. PATENT DOCUMENTS

| | | | | |
|---|---|---|---|---|
| 11,489,709 | B2 * | 11/2022 | Yokomakura | ....... H04L 27/2602 |
| 2021/0321447 | A1 | 10/2021 | Lee et al. | |
| 2022/0321389 | A1 | 10/2022 | Taherzadeh Boroujeni et al. | |

FOREIGN PATENT DOCUMENTS

| | | |
|---|---|---|
| WO | WO-2022192630 A1 | 9/2022 |

OTHER PUBLICATIONS

International Search Report and Written Opinion—PCT/US2025/038309—ISA/EPO—Nov. 11, 2025.

* cited by examiner

*Primary Examiner* — Zewdu A Kassa
(74) *Attorney, Agent, or Firm* — Holland & Hart LLP

(57) ABSTRACT

Methods, systems, and devices for wireless communications are described. A first wireless device may multiplex, in a frequency domain and in a first symbol that is adjacent to and before a phase jump boundary, a first (e.g., glue) reference signal with first shared data for a first shared resources. The first wireless device may map, to a second symbol that is adjacent to and after the phase jump boundary, a second reference signal associated with a second shared resources. The first wireless device may transmit the first shared resources including the first reference signal multiplexed with the first shared data, the second shared resources, and the second reference signal according to a discrete Fourier transform-spread-orthogonal frequency division multiplexing (DFT-s-OFDM) scheme. A second wireless device may perform joint channel estimation using a first phase estimate associated with the first symbol and using a second phase estimate associated with the second symbol.

30 Claims, 15 Drawing Sheets

410-a                    410-b

2X RBs

405 ⟋ [hatched] DMRS

415 ⟋ [dotted] PxSCH

420 ⟋ [dark] gRS

425 ⟋ [white] Reserved Resources frequency time

400

605-a 605-b

610 — Multiplex 1<sup>st</sup> RS

615 — Map 2<sup>nd</sup> RS

620 — 1<sup>st</sup> Shared Channel

625 — 2<sup>nd</sup> Shared Channel

Joint Channel Estimation — 630

600

710

720

715

705

700

130    105    115

Network
Entity

Transceiver    Antenna 1110    1115

Communications
Manager    Memory

Code

1130

1120    1125

1140    Processor

1135

1105

1100

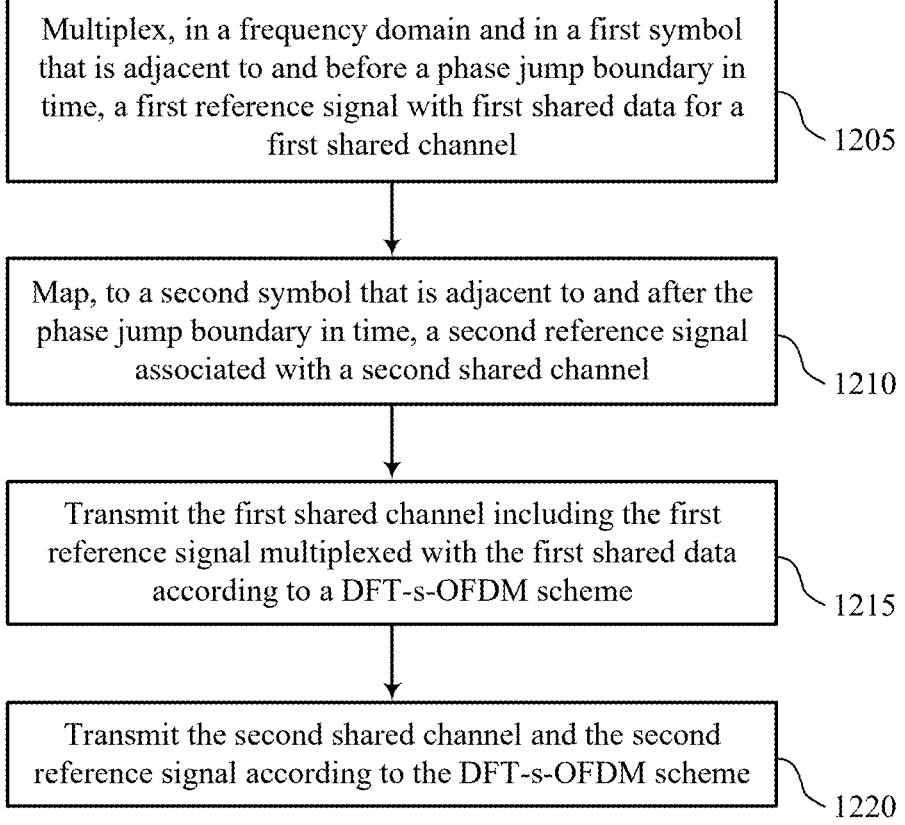

Multiplex, in a frequency domain and in a first symbol that is adjacent to and before a phase jump boundary in time, a first reference signal with first shared data for a first shared channel

1205

Map, to a second symbol that is adjacent to and after the phase jump boundary in time, a second reference signal associated with a second shared channel

1210

Transmit the first shared channel including the first reference signal multiplexed with the first shared data according to a DFT-s-OFDM scheme

1215

Transmit the second shared channel and the second reference signal according to the DFT-s-OFDM scheme

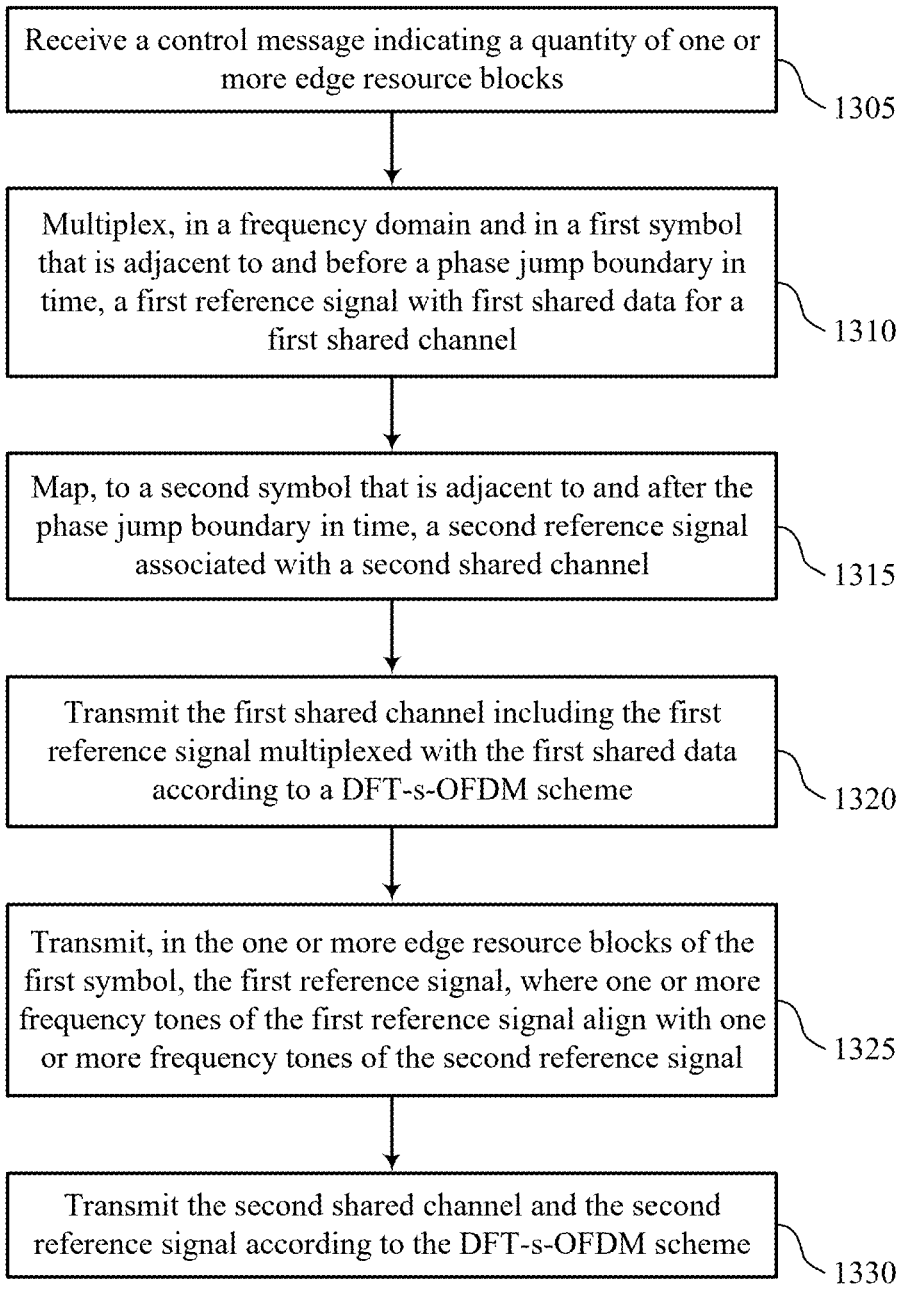

Receive a control message indicating a quantity of one or more edge resource blocks
⌐1305

Multiplex, in a frequency domain and in a first symbol that is adjacent to and before a phase jump boundary in time, a first reference signal with first shared data for a first shared channel
⌐1310

Map, to a second symbol that is adjacent to and after the phase jump boundary in time, a second reference signal associated with a second shared channel
⌐1315

Transmit the first shared channel including the first reference signal multiplexed with the first shared data according to a DFT-s-OFDM scheme
⌐1320

Transmit, in the one or more edge resource blocks of the first symbol, the first reference signal, where one or more frequency tones of the first reference signal align with one or more frequency tones of the second reference signal
⌐1325

Transmit the second shared channel and the second reference signal according to the DFT-s-OFDM scheme
⌐1330

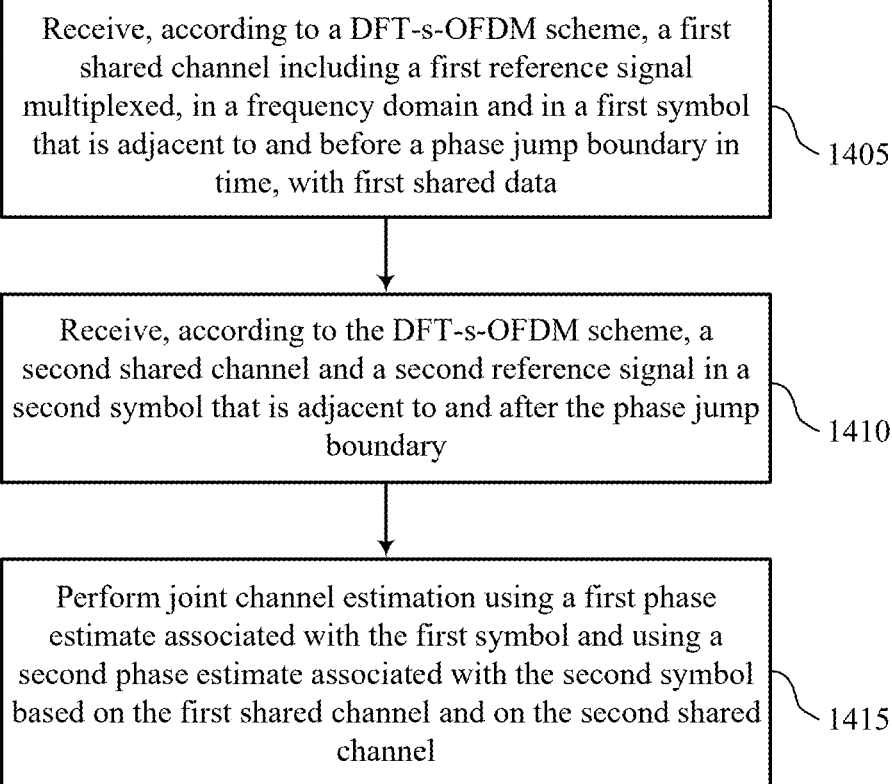

Receive, according to a DFT-s-OFDM scheme, a first shared channel including a first reference signal multiplexed, in a frequency domain and in a first symbol that is adjacent to and before a phase jump boundary in time, with first shared data

1405

Receive, according to the DFT-s-OFDM scheme, a second shared channel and a second reference signal in a second symbol that is adjacent to and after the phase jump boundary

1410

Perform joint channel estimation using a first phase estimate associated with the first symbol and using a second phase estimate associated with the second symbol based on the first shared channel and on the second shared channel

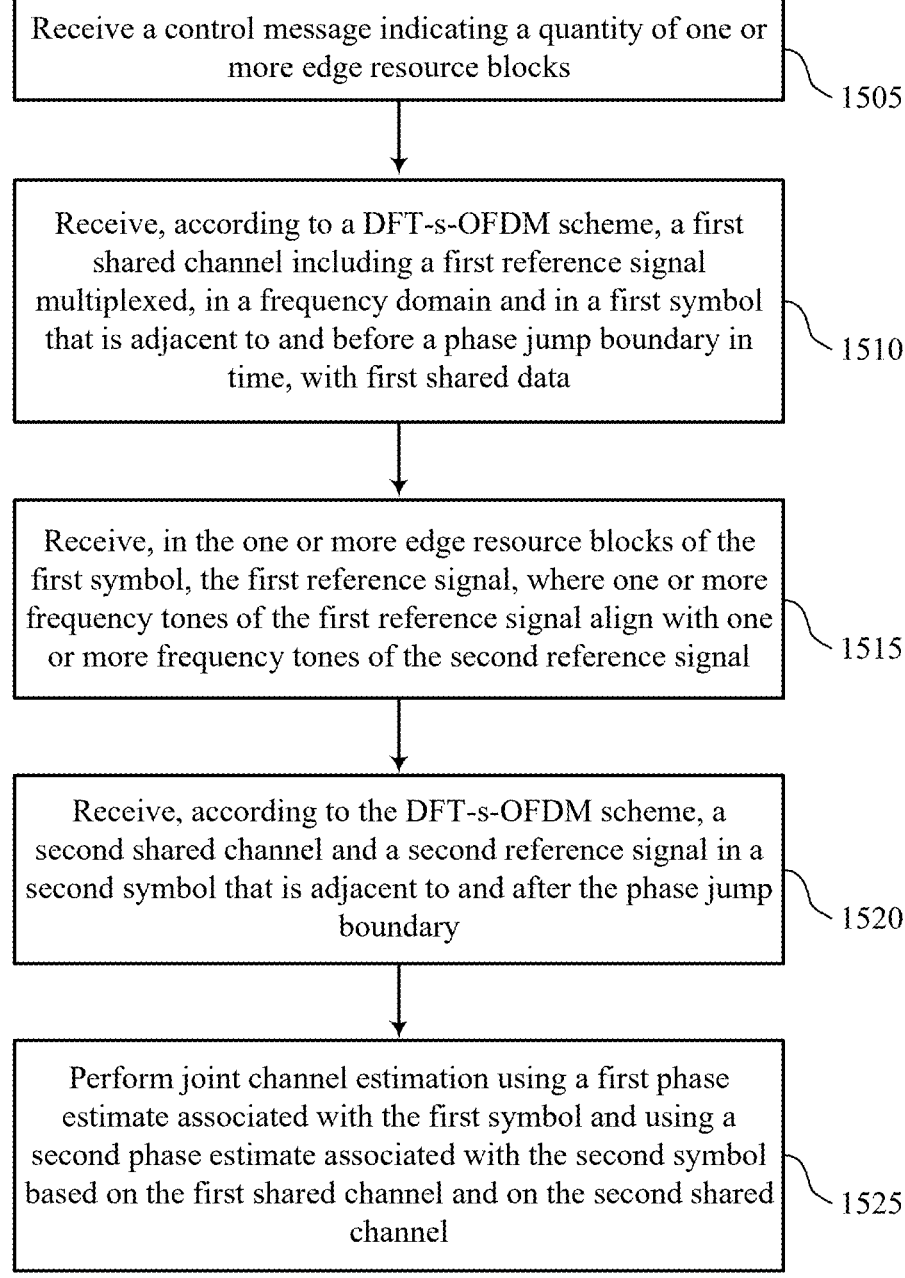

Receive a control message indicating a quantity of one or more edge resource blocks
1505

Receive, according to a DFT-s-OFDM scheme, a first shared channel including a first reference signal multiplexed, in a frequency domain and in a first symbol that is adjacent to and before a phase jump boundary in time, with first shared data
1510

Receive, in the one or more edge resource blocks of the first symbol, the first reference signal, where one or more frequency tones of the first reference signal align with one or more frequency tones of the second reference signal
1515

Receive, according to the DFT-s-OFDM scheme, a second shared channel and a second reference signal in a second symbol that is adjacent to and after the phase jump boundary
1520

Perform joint channel estimation using a first phase estimate associated with the first symbol and using a second phase estimate associated with the second symbol based on the first shared channel and on the second shared channel
1525

GLUE REFERENCE SIGNALS FOR JOINT CHANNEL ESTIMATION ACROSS A PHASE JUMP BOUNDARY

FIELD OF TECHNOLOGY

The following relates to wireless communications, including glue reference signals (gRSs) for joint channel estimation across a phase jump boundary.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a wireless device is described. The method may include multiplexing, in a frequency domain and in a first symbol that is adjacent to and before a phase jump boundary in time, a first reference signal with first shared data in first shared resources, mapping, to a second symbol that is adjacent to and after the phase jump boundary in time, a second reference signal associated with second shared resources, transmitting, via the first shared resources, the first reference signal multiplexed with the first shared data according to a discrete Fourier transform-spread-orthogonal frequency division multiplexing (DFT-s-OFDM) scheme, and transmitting, via the second shared resources, the second reference signal according to the DFT-s-OFDM scheme.

A wireless device for wireless communications is described. The wireless device may include one or more memories storing processor executable code, and one or more processors coupled with the one or more memories. The one or more processors may individually or collectively be operable to execute the code to cause the wireless device to multiplexing, in a frequency domain and in a first symbol that be adjacent to and before a phase jump boundary in time, a first reference signal with first shared data in first shared resources, mapping, to a second symbol that be adjacent to and after the phase jump boundary in time, a second reference signal associated with second shared resources, transmit, via the first shared resources, the first reference signal multiplexed with the first shared data according to a DFT-s-OFDM scheme, and transmit, via the second shared resources, the second reference signal according to the DFT-s-OFDM scheme.

Another wireless device for wireless communications is described. The wireless device may include means for multiplexing, in a frequency domain and in a first symbol that is adjacent to and before a phase jump boundary in time, a first reference signal with first shared data in first shared resources, means for mapping, to a second symbol that is adjacent to and after the phase jump boundary in time, a second reference signal associated with second shared resources, means for transmitting, via the first shared resources, the first reference signal multiplexed with the first shared data according to a DFT-s-OFDM scheme, and means for transmitting, via the second shared resources, the second reference signal according to the DFT-s-OFDM scheme.

A non-transitory computer-readable medium storing code for wireless communications is described. The code may include instructions executable by one or more processors to multiplexing, in a frequency domain and in a first symbol that be adjacent to and before a phase jump boundary in time, a first reference signal with first shared data in first shared resources, mapping, to a second symbol that be adjacent to and after the phase jump boundary in time, a second reference signal associated with second shared resources, transmit, via the first shared resources, the first reference signal multiplexed with the first shared data according to a DFT-s-OFDM scheme, and transmit, via the second shared resources, the second reference signal according to the DFT-s-OFDM scheme.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 12 through 15 show flowcharts illustrating methods that support glue reference signals for joint channel estimation across a phase jump boundary in accordance with one or more aspects of the present disclosure.

DETAILED DESCRIPTION

Figure 1:
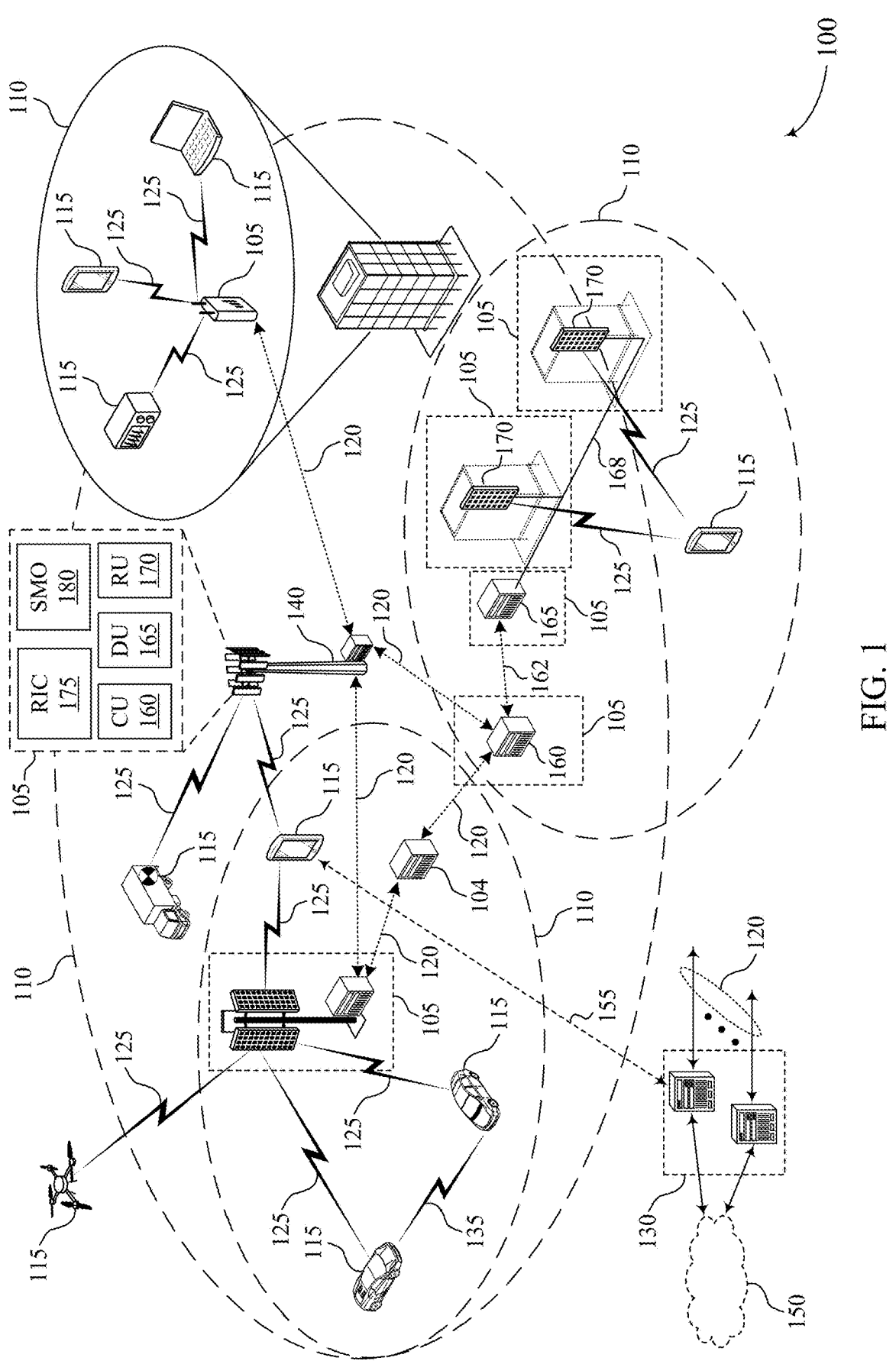
FIGS. 1 and 2 show examples of wireless communications systems that support glue reference signals (gRSs) for joint channel estimation across a phase jump boundary in accordance with one or more aspects of the present disclosure.

In some wireless communications systems, a transmitting device may transmit a data transmission (e.g., via physical uplink shared channel (PUSCH), via physical downlink shared channel (PDSCH), via physical sidelink shared channel (PSSCH)) over multiple slots. In such cases, each slot may include a demodulation reference signal (DMRS) that is multiplexed with the data and used to aid a receiving device in decoding the data transmission. In some cases, however, DMRS ports associated with DMRS transmissions in each slot may lack coherence (e.g., phase coherence), and a difference in phase between consecutive slots of the data transmission may affect decoding efficiency (e.g., because independent phase changes, or phase "jumps," may need to be estimated per port). As a result, an additional reference signal (e.g., a phase difference estimation reference signal, a phase change estimation reference signal), which may be referred to as a glue reference signal (gRS), may be included with the data transmission to assist the receiving device in determining the phase change between the consecutive slots. In particular, a gRS may be located near the end of a first slot, a phase jump boundary may be located between the first slot and a second slot, and a second reference signal (e.g., a DMRS or another gRS) may be located near the beginning of the second slot. The gRS and the DMRS may be used by the receiving device for estimating a phase change between the respective slots, as well as for joint channel estimation for the data transmission. However, techniques may be needed to define how to include a gRS waveform with discrete Fourier transform-spread-orthogonal frequency division multiplexing (DFT-s-OFDM) data transmissions.

In some implementations, for DFT-s-OFDM, a transmitting device may frequency division multiplex a first reference signal (e.g., a gRS waveform) with first shared data in first shared resources (e.g., a PxSCH, which may be a PDSCH, PUSCH, or PSSCH, or a first portion of a PxSCH) in a first symbol that is adjacent to and before a phase jump boundary. The transmitting device may map a second reference signal (e.g., a second gRS or a DMRS) to a second symbol that is adjacent to and after the phase jump boundary, where the second reference signal is associated with second shared resources (e.g., a second PxSCH, or a second portion of the PxSCH). The transmitting device may transmit the first reference signal and the second reference signal including the first reference signal and the second reference signal according to a DFT-s-OFDM scheme in order to help a receiving device estimate the phase jump from the first symbol to a second symbol. For example, the transmitting device may transmit the gRS in a quantity of resource elements (REs) according to a block pattern, thus aligning the gRS tones (e.g., frequency resources) with one or more DMRS tones by subsampling the DMRS tones. In some examples, the transmitting device may transmit the gRS in one or more edge RBs of the first symbol. An edge RB may be located within a threshold frequency range relative to a frequency boundary of the first shared resources (e.g., a relatively high frequency edge, a relatively low frequency edge, or both). The gRS RBs may occupy contiguous frequency tones or may be placed according to a pattern (e.g., transmitting a quantity of gRS REs every 1, 2, or 4 RBs). In some cases, the transmitting device may use a same sequence to transmit the gRS as the DMRS. For example, the transmitting device may transmit the gRS with a sub-sampled type-1 low peak-to-average-power-ratio (PAPR) sequence that is the same sequence used to transmit the DMRS (e.g., if sequence hopping is enabled, the same symbol and subframe number may be used to generate an initial scrambling seed for the DMRS and for the gRS). In some examples, the transmitting device may transmit the gRS using a type-1 low PAPR sequence, a post-DFT binary phase shift keying (BPSK) sequence, or a random quadrature phase shift keying (QPSK) sequence. In some examples, the transmitting device may rate match the first shared data around the gRS or vice versa.

Particular aspects of the subject matter described herein may be implemented to realize one or more potential advantages. The described techniques may provide for reduced processing (e.g., see slide 4, if they've got a same sequence) and reduced overhead, improved communication reliability, improved user experience related to reduced processing, and improved coordination between devices. For example, if the gRS and the DMRS across the phase jump boundary share a same sequence and a same or at least partially overlapping set of frequency tones, then then receiving device may directly compute the phase jump across the phase jump boundary without performing sequence descrambling. The techniques described herein may improve coordination between devices by improving phase estimation across a phase jump boundary while maintaining a low PAPR property.

Aspects of the disclosure are initially described in the context of wireless communications systems. Aspects of the disclosure are then described in the context of resource diagrams and a process flow. Aspects of the disclosure are further illustrated by and described with reference to apparatus diagrams, system diagrams, and flowcharts that relate to glue reference signals for joint channel estimation across a phase jump boundary.

FIG. 1 shows an example of a wireless communications system 100 that supports glue reference signals for joint channel estimation across a phase jump boundary in accordance with one or more aspects of the present disclosure. The wireless communications system 100 may include one or more devices, such as one or more network devices (e.g., network entities 105), one or more user equipments (UEs) 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

The wireless communications system 100 may be configured to support ultra-reliable communications or low-latency communications, or various combinations thereof.

For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In the wireless communications system 100, a transmitting device may transmit a data transmission (e.g., via PUSCH, via PDSCH, via PSSCH) over multiple slots. In such cases, each slot may include a DMRS that is multiplexed with the data and used to aid a receiving device in decoding the data transmission. The transmitting device and the receiving device may each be examples of a UE 115 or a network entity 105, and may communicate via a communication link 125. In some cases, however, DMRS ports associated with DMRS transmissions in each slot may lack coherence (e.g., phase coherence), and a difference in phase between consecutive slots of the data transmission may affect decoding efficiency (e.g., because independent phase changes, or phase "jumps," may need to be estimated per port). As a result, an additional reference signal (e.g., a phase difference estimation reference signal, a phase change estimation reference signal), which may be referred to as a gRS, may be included with the data transmission to assist the receiving device in determining the phase change between the consecutive slots. In particular, a gRS may be located near the end of a first slot, a phase jump boundary may be located between the first slot and a second slot, and a second reference signal (e.g., a DMRS or another gRS) may be located near the beginning of the second slot. The gRS and the DMRS may be used by the receiving device for estimating a phase change between the respective slots, as well as for joint channel estimation for the data transmission. However, techniques may be needed to define how to include a gRS waveform with DFT-s-OFDM data transmissions.

In some implementations, for DFT-s-OFDM, a transmitting device may frequency division multiplex a first reference signal (e.g., a gRS waveform) with first shared data in first shared resources (e.g., a PxSCH, which may be a PDSCH, PUSCH, PSSCH, or a first portion of a PxSCH) in a first symbol that is adjacent to and before a phase jump boundary. The transmitting device may map a second reference signal (e.g., a second gRS or a DMRS) to a second symbol that is adjacent to and after the phase jump boundary, where the second reference signal is associated with a second shared resources (e.g., a second PxSCH, or a second portion of the PxSCH). The transmitting device may transmit the first reference signal and the second reference signal including the first reference signal and the second reference signal according to a DFT-s-OFDM scheme in order to help a receiving device estimate the phase jump from the first symbol to a second symbol. For example, the transmitting device may transmit the gRS in a quantity of resource elements (REs) according to a block pattern, thus aligning the gRS tones (e.g., frequency resources) with one or more DMRS tones by subsampling the DMRS tones. In some examples, the transmitting device may transmit the gRS in one or more edge RBs of the first symbol. An edge RB may be located within a threshold frequency range relative to a frequency boundary of the first shared resources (e.g., a relatively high frequency edge, a relatively low frequency edge, or both). The gRS RBs may occupy contiguous frequency tones or may be placed according to a pattern (e.g., transmitting a quantity of gRS REs every 1, 2, or 4 RBs). In some cases, the transmitting device may use a same sequence to transmit the gRS as the DMRS. For example, the transmitting device may transmit the gRS with a subsampled type-1 low PAPR sequence that is the same sequence used to transmit the DMRS (e.g., if sequence hopping is enabled, the same symbol and subframe number may be used to generate an initial scrambling seed for the DMRS and for the gRS). In some examples, the transmitting device may transmit the gRS using a type-1 low PAPR sequence, a post-DFT BPSK sequence, or a random QPSK sequence. QPSK may be a form of phase shift keying in which two bits are modulated at once, selecting one of four possible carrier phase shifts (e.g., 0, 90, 180, or 270 degrees). QPSK may allow a signal to carry twice as much information as ordinary phase shift keying using the same bandwidth. In some examples, the transmitting device may rate match the first shared data around the gRS or vice versa.

Figure 2:
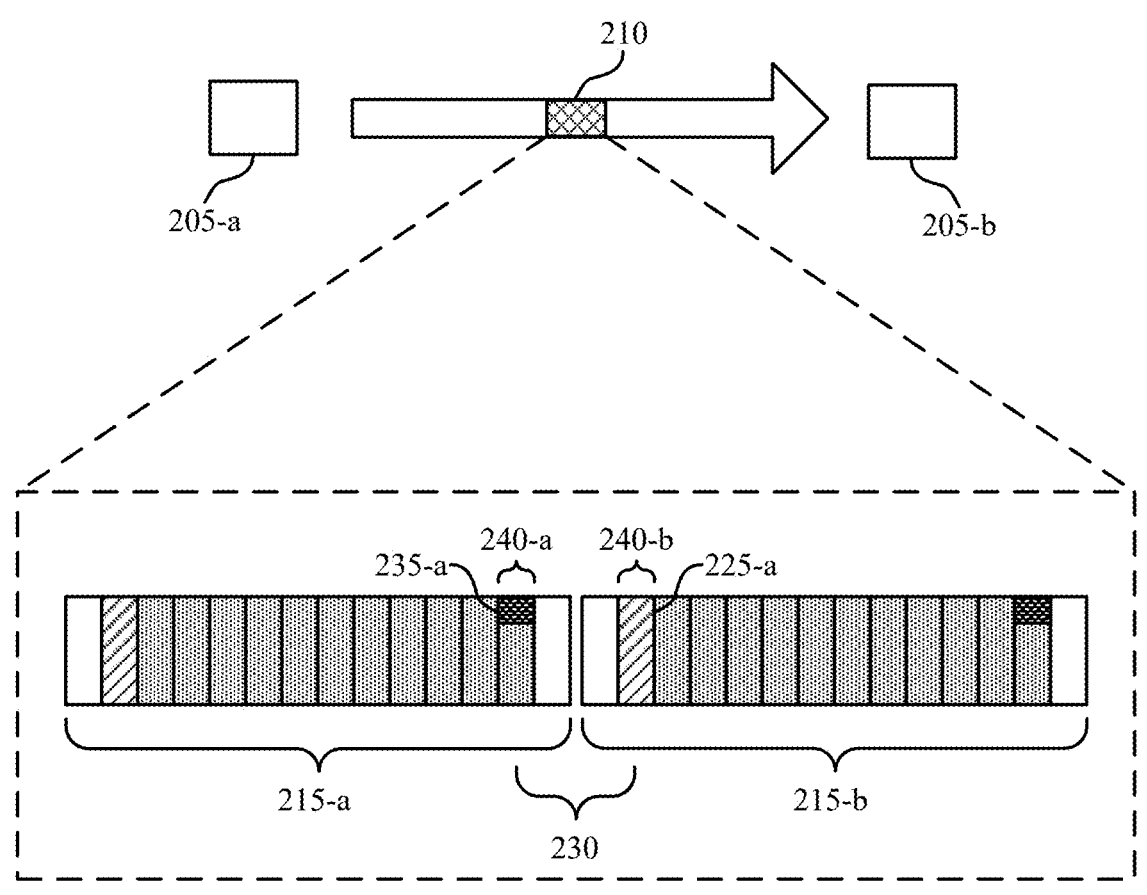
Figure 2:
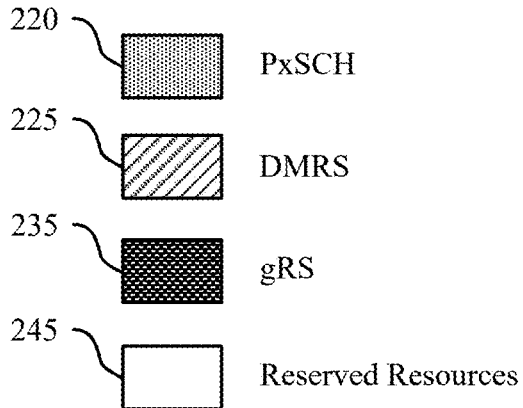

FIG. 2 shows an example of a wireless communications system 200 that supports glue reference signals for joint channel estimation across a phase jump boundary in accordance with one or more aspects of the present disclosure. In some examples, the wireless communications system 200 may implement aspects of the wireless communications system 100. For example, the wireless communications system 200 includes a first wireless device 205-a and a second wireless device 205-b, which may each be examples of a UE 115 or a network entity 105 described with reference to FIG. 1. Additionally, or alternatively, the first wireless device 205-a and the second wireless device 205-b may each be examples of other types of wireless devices, such as an IAB node or another type of transmitter or receiver. In some examples, the first wireless device 205-a and the second wireless device 205-b may be the same type of device, while in other examples the first wireless device 205-a may be a different type of device than the second wireless device 205-b. As described herein, operations performed by the first wireless device 205-a and the second wireless device 205-b may be respectively performed by a UE 115, a network entity 105, or another wireless device, and the examples shown should not be construed as limiting.

In some examples, the first wireless device 205-a may transmit a data transmission 210 over multiple slots 215 (e.g., a first slot 215-a and a second slot 215-b). The first wireless device 205-a may transmit the data transmission 210 via a PxSCH 220, which may be any channel that carries data for one or more users, including PDSCH, PUSCH, and PSSCH). In such cases, each slot may include a DMRS 225 that is multiplexed with the data and used to aid a receiving device (e.g., the second wireless device 205-b) in decoding the data transmission. For example, the second wireless device 205-b may utilize one or more previous DMRSs 225 to decode the PxSCH 220 in the second slot 215-b. However, phase continuity may be a problem for fluid start and length indicator values (SLIVs) and DMRS 225 sharing across multiple SLIVs, where a SLIV may define a start symbol and a quantity of consecutive symbols 240 for shared data allocation using a single number. That is, one or more DMRS ports associated with one or more DMRS 225 transmissions in each slot 215 may lack coherence (e.g., phase coherence), and a difference in phase between the first slot 215-a and the second slot 215-b may affect decoding efficiency (e.g., because independent phase changes, or phase "jumps," may need to be estimated per port). That is, there may be a phase jump boundary 230 between the first slot 215-a and the second slot 215-b may affect joint channel estimation at the second wireless device 205-b. As a result, an additional reference signal (e.g., a phase difference estimation reference signal, a phase change estimation reference signal, a relatively low density reference signal), which may be referred to as a gRS 235, may be included with the data transmission 210 to assist the second wireless device 205-b in determining the phase change between the consecutive slots. In particular, a first reference signal (e.g., the gRS 235-a) may be located near the end of the first slot 215-a (e.g., in the first symbol 240-a) before the phase jump boundary 230 and a second reference signal (e.g., a second gRS or the DMRS 225-a) may be located near the beginning of the second slot 215-b (e.g., in the second symbol 240-b).

The placement of the gap gluing reference signal (e.g., the gRS 235-a) around the potential logical or physical gap in which a phase jump or gain state change may occur (e.g., the phase jump boundary 230) may allow the second wireless device 205-b to estimate the phase jump and perform joint channel estimation. One or more other resources in the first slot 215-a and the second slot 215-b may be occupied by one or more reserved resources 245, which may be reserved for uplink, downlink, or sidelink control signaling or for another purpose.

For PUSCH (e.g., in NR), when a transform precoder is on, a QPSK phase tracking reference signal (PTRS) sequence may be rate matched together with PUSCH data symbols before DFT precoding. In some examples, the first wireless device 205-a may support DFT-s-OFDM waveform to support a relatively large coverage area (e.g., compared to a cyclic prefix (CP)-OFDM waveform). In DFT-s-OFDM, a transmitting device (e.g., the first wireless device 205-a) may transmit one or more quadrature amplitude modulation (QAM) symbols in the time domain, insert one or more data symbols into a DFT precoder, map the data symbols into one or more frequency tones, applying an inverse fast Fourier transform (iFFT), add a cyclic prefix, and transmit the data over the air. For DFT-s-OFDM, PUSCH DMRS may be time domain multiplexed with PUSCH symbols (e.g., because the DFT precoding may only apply to data symbols) and the DMRS sequence may be rc/2 BPSK before DFT if dmrs-UplinkTransformPrecoding is equal to one. Otherwise, if dmrs-UplinkTransformPrecoding is not equal to one, then the DMRS sequence may be a type-1 low PAPR sequence (e.g., a Chu sequence or a computer-generated sequence). In some OFDM designs (e.g., designs not associated with DFT-s-OFDM), a PTRS waveform may be used as the base waveform for gRS, in which the first wireless device 205-a transmits the gRS 235 in a quantity (e.g., 1 or more) resource elements in every quantity of resource blocks (e.g., every X resource blocks) associated with the DMRS 225. The gRS 235 may have the same structure as the DMRS 225. Thus, the second wireless device 205-b may estimate the phase jump (e.g., associated with the phase jump boundary 230) from the gRS 235 and the DMRS 225 when the DMRS symbol (e.g., the second symbol 240-b) is close to the phase jump gap, which may reduce overhead associated with the gRS 235. However, gRS waveform designs for DFT-s-OFDM may be desirable.

In some cases, when a DMRS symbol (e.g., the second symbol 240-b) is near the phase jump boundary 230, the first wireless device 205-a may not place two gRS symbols across the phase jump boundary 230. That is, the first wireless device 205-a may not place a gRS 235 in the first symbol 240-a and the second symbol 240-b when a DMRS 225 is placed in either the first symbol 240-a or the second symbol 240-b. In some examples, the glue reference signal waveform may share a same post-DFT sequence with the DMRS 225 and the same frequency tones. That is, the first wireless device 205-a may transmit the gRS 235-a using the same post-DFT sequence that the first wireless device 205-a uses to transmit the DMRS 225-a, and a set of frequency tones used to transmit the gRS 235-a may at least partially overlap with a set of frequency tones used to transmit the DMRS 225-a. For example, the set of frequency tones used to transmit the gRS 235-a may be a subset of the frequency tones used to transmit the DMRS 225-a. Additionally, or alternatively, a first gRS 235-a may be placed in the first symbol 240-a and a second gRS 235 may be placed in the second symbol 240-b, and the first gRS 235-a and the second gRS 235 may share a same sequence and tone placement. In either case, when the first wireless device 205-*a* transmits a first reference signal in the first symbol 240-*a* (e.g., the gRS 235-*a* placed before the phase jump boundary 230) and a second reference signal in the second symbol 240-*b* (e.g., a second gRS 235 or the DMRS 225-*a* placed after the phase jump boundary 230) using a same sequence and a same (or similar, at last partially overlapping) tone placement, then the second wireless device 205-*b* may directly compute the phase jump across the phase jump boundary 230 without performing sequence descrambling. If the first reference signal and the second reference signal across the phase jump boundary 230 do not share a same sequence (e.g., the first wireless device 205-*a* transmits the gRS 235-*a* using a different sequence than used to transmit the DMRS 225-*a*), then the second wireless device 205-*b* may perform sequence descrambling.

In some implementations, for DFT-s-OFDM PxSCH 220 transmission, the first wireless device 205-*a* (e.g., a transmitting device) may frequency domain multiplex the gRS 235-*a* waveform with the PxSCH 220 (e.g., PDSCH, PUSCH, PSSCH) in the first symbol 240-*a* of the first slot 215-*a* to help the second wireless device 205-*b* (e.g., a receiving device) estimate a phase jump across the phase jump boundary 230. In other words, the first wireless device 205-*a* may multiplex, in the frequency domain and in the first symbol 240-*a* that is adjacent to and before the phase jump boundary 230, a first reference signal (e.g., the gRS 235-*a*) in first shared resources (e.g., the PxSCH 220 in the first slot 215-*a*). The first wireless device 205-*a* may map, to a second symbol (e.g., the second symbol 240-*b*) that is adjacent to and after the phase jump boundary 230 in time, a second reference signal (e.g., a second gRS 235 or the DMRS 225-*a*) associated with second shared resources (e.g., the PxSCH 220 in the second slot 215-*b*). The first wireless device 205-*a* may transmit, and the second wireless device 205-*b* may receive, the first reference signal multiplexed with the first shared data according to a DFT-s-OFDM scheme. The first wireless device 205-*a* may also transmit, and the second wireless device 205-*b* may receive, the second reference signal according to the DFT-s-OFDM scheme. The second wireless device 205-*b* may perform joint channel estimation using a first phase estimate associated with the first symbol 240-*a* and using a second phase estimate associated with the second symbol 240-*b* based on the first reference signal and the second reference signal.

The first wireless device 205-*a* may determine a tone location for the post-DFT gRS waveform. Across the phase jump boundary 230, two post-DFT gRS symbols sharing the same frequency tone locations may result in improved phase jump estimation in a frequency selective channel, compared to two post-DFT gRS symbols with differing frequency tone locations. For example, the second wireless device 205-*b* may take the difference between a first set of frequency tones associated with the gRS 235-*a* and a second set of frequency tones associated with the DMRS 225-*a* and compute the phase difference across the phase jump boundary 230. When there is a DMRS 225 in a symbol 240 near the phase jump boundary 230 (e.g., the second symbol 240-*b*), the first wireless device 205-*a* may not place two gRS 235 symbols across the phase jump boundary 230. Thus, the first reference signal may be the gRS 235-*a* and the second reference signal may be the DMRS 225-*a*. If the gRS 235-*a* waveform shares the same frequency tone locations as the DMRS 225-*a* (e.g., the first wireless device 205-*a* transmits the gRS 235-*a* using a first set of frequency tones that at least partially overlap with a second set of frequency tones used to transmit the DMRS 225-*a*, or the first set of frequency tones are a subset of the second set of frequency tones), the second wireless device 205-*b* may directly compute the phase jump across the phase jump boundary 230.

The first wireless device 205-*a* may select the gRS tone locations (e.g., the frequency resources to transmit the gRS 235 in the first symbol 240-*a*) in one of several methods. In a first example, for DFT-s-OFDM, the first wireless device 205-*a* may transmit the gRS 235-*a* in 1 or M (e.g., depending on whether to apply a frequency domain or time domain orthogonal cover code M from the DMRS 225-*a*) resource elements every X resource blocks, with the gRS 235-*a* frequency tones aligning with the DMRS 225-*a* frequency tones by subsampling the DMRS 225-*a* frequency tones. That is, the first wireless device 205-*a* may transmit, in the first symbol 240-*a*, the first reference signal (e.g., the gRS 235-*a*) in a first quantity of resource elements according to a resource block pattern. The first quantity of resource elements (e.g., M) may be based on one or more orthogonal cover codes associated with the second reference signal (e.g., the DMRS 225-*a*). One or more frequency tones of the gRS 235-*a* may align (e.g., at least partially overlap in the frequency domain) with one or more frequency tones of the DMRS 225-*a*. In some cases, the quantity of resource blocks (e.g., X) may be preconfigured to a value of X=1, 2, or 4 resource blocks. For example, the first wireless device 205-*a* may receive a control message (e.g., from the second wireless device 205-*b* or another device) indicating a quantity of the one or more resource blocks. This may be similar to OFDM PxSCH gRS designs. However, for DFT-s-OFDM, rate matching the DFT-s PxSCH 220 around one or more resource elements associated with the gRS 235-*a* may affect the low PAPR property of the DFT-s PxSCH 220.

Additionally, or alternatively, to avoid disturbing the frequency tone structure of the DFT-s PxSCH 220 and to preserve the low PAPR property of the DFT-s PxSCH 220, the first wireless device 205-*a* may place the gRS 235-*a* at the edge of the PxSCH 220 (e.g., one or both edges), as illustrated by and described in more detail with reference to FIG. 3. In some implementations, for DFT-s-OFDM, the first wireless device 205-*a* may transmit the gRS 235-*a* at the edge resource blocks of the PxSCH 220 and align with the DMRS 225-*a* frequency tones. That is, the first wireless device 205-*a* may transmit the first reference signal (e.g., the gRS 235-*a*) in one or more edge resource blocks of the first symbol 240-*a*, where one or more frequency tones of the first reference signal may align (e.g., partially overlap) with one or more frequency tones of the second reference signal (e.g., the DMRS 225-*a*). The one or more edge resource blocks of the first symbol 240-*a* may be located within a threshold frequency range relative to a frequency boundary (e.g., an upper frequency boundary, a lower frequency boundary, or both) of the first shared resources (e.g., the PxSCH 220 in the first slot 215-*a*). In some examples, the first wireless device 205-*a* may receive a control message indicating a quantity of the one or more edge resource blocks. For example, a device or a standard may configure the quantity of edge resource blocks to be one, two, or four resource blocks, such that a quantity of gRS resource elements may be transmitted in every other edge resource block, in every two edge resource blocks, or in every four edge resource blocks, respectively. In other words, the first wireless device 205-*a* may transmit the gRS 235-*a* in a comb pattern at one or more frequency edges of the first symbol 240-*a*. The first wireless device 205-*a* may place the gRS 235-*a* resource elements at the edge resource blocks of the PxSCH 220 in the first symbol 240-*a*, with one or more contiguous frequency tones for the PxSCH 220 in the center-frequency tones to maintain a low PAPR property. The gRS 235-a resource elements may occupy one or more frequency tones that are the same as, partially overlapping with, or aligned with one or more frequency tones associated with the DMRS 225-a per resource block. In some examples, the gRS 235-a resource elements may occupy a relatively high-frequency edge, a relatively low-frequency edge, or both of the PxSCH 220 in the first symbol 240-a. In such examples, the DFT-s PxSCH 220 may be contiguous in the frequency domain and may retain a low PAPR. In some examples, the gRS 235-a resource elements may occupy both the high-frequency edge and the low-frequency edge for improved frequency diversity and improved phase ramp change estimation. For example, in a high-bandwidth scenario, the low-frequency edge may experience some fading, the gRS at the high-frequency edge may compensate for the fading.

In some examples, to maintain low overhead for the gRS 235-a, a threshold configuration for a quantity of frequency tones (e.g., 12 tones) may be configured based on a modulation and coding scheme (MCS) (e.g., regardless of a resource allocation). A relatively high MCS may be associated with an improved phase jump estimate and a higher quantity of gRS frequency tones. The first wireless device 205-a may be configured with one or more MCS thresholds, where the first wireless device 205-a may use a first quantity of gRS frequency tones based on not exceeding an MCS threshold and may use a second quantity of gRS frequency tones based on exceeding the MCS threshold.

Additionally, or alternatively, for DFT-s-OFDM, the first wireless device 205-a may transmit the gRS 235-a in one or more edge resource blocks of the PxSCH 220 and in one or more contiguous frequency tones, as illustrated by and described in more detail with reference to FIG. 4. That is, the first wireless device 205-a may transmit, in the first symbol 240-a, the first reference signal (e.g., the gRS 235-a) in one or more edge resource blocks of the first shared resources (e.g., the PxSCH 220) in one or more contiguous frequency tones, where the one or more contiguous frequency tones may be located within a threshold frequency range relative to a frequency boundary of the first shared resources. A quantity of gRS resource elements, a quantity of resource blocks in which to include the quantity of gRS resource elements, or both may be preconfigured (e.g., in a standard or via control signaling received from another device). The gRS resource elements may be placed at the edge resource blocks of the PxSCH 220 and may occupy contiguous frequency tones (e.g., not in a comb pattern). In some examples, placement of the gRS 235-a in one or two edges in frequency domain resource allocation (FDRA) may be possible. In some examples, the frequency tones of the gRS 235-a may be different from the frequency tones of the DMRS 225-a.

Several design options are available depending on whether the gRS 235-a shares the same sequence with the DMRS 225-a. For example, the type-1 Chu sequence group may depend on $$u = \left(f_{gh} + n_{ID}^{RS}\right)\mathrm{mod}\ 30,$$

where $n_{ID}^{RS}$ may be determined by the higher layer parameter nPUSCH-Identity. The group hopping parameter $f_{gh}$ may also be higher layer configured. If the sequence hopping is enabled and $f_{gh}=0$, then Equation 1 may hold true, where $c(i)$ may be a pseudo-random sequence with an initial seed value $$c_{init} = n_{ID}^{RS}.$$

$$v = \begin{cases} c\left(N_{symb}^{slot}n_{s,f}^{u} + l\right) \text{ if } M_{ZC} \geq 6N_{SC}^{RB} \\ 0 \text{ otherwise} \end{cases} \quad \text{Equation 1}$$

In some implementations, for DFT-s-OFDM, the first wireless device 205-a may transmit the gRS 235-a with a subsampled type-1 low PAPR sequence that may be the same as a DMRS 225-a sequence. That is, the first wireless device 205-a may subsample a type-1 low PAPR sequence associated with the second reference signal (e.g., the DMRS 225-a or a second gRS 235) and transmit the first reference signal (e.g., the gRS 235-a) using the subsampled type-1 low PAPR sequence. In some examples, the DMRS 225-a may be associated with the type-1 low PAPR sequence and the first wireless device 205-a may select a gRS tone location as described herein. The first wireless device 205-a may transmit the gRS 235-a in a quantity of resource elements (e.g., based on an orthogonal cover code associated with the DMRS 225-a) with one or more gRS frequency tones aligned (e.g., at least partially overlapping) with one or more DMRS frequency tones by subsampling the one or more DMRS frequency tones. In some examples, if sequence hopping is enabled, the first wireless device 205-a may select a same symbol and subframe number for generating an initial scrambling seed value for the gRS 235-a with the paired reference signal (e.g., the DMRS 225-a or a second gRS 235) across the phase jump boundary 230. This may ensure that the gRS 235-a uses the same sequence as the DMRS 225-a. In other words, the first wireless device 205-a may generate an initial scrambling seed value for the first reference signal based on a same symbol and a same subframe number associated with the second reference signal.

Additionally, or alternatively, when the pre-DFT $\pi/2$ BPSK sequence is configured for the DMRS 225-a, the first wireless device 205-a may generate the random sequence with an initial seed $c_{init}$ as shown in Equation 2.

$$c_{init} = \left(2^{17}\left(N_{sym}^{slot}n_{s,f}^{u} + l + 1\right)\left(2N_{ID}^{nSCID} + 1\right) + 2N_{ID}^{nSCID} + n_{SCID}\right)\mathrm{mod}\ 2^{31} \quad \text{Eq. 2}$$

For DFT-s-OFDM, the first wireless device 205-a may transmit the gRS 235-a with a subsampled post-DFT $\pi/2$ BPSK sequence that may be the same as a sequence for the DMRS 225-a. For example, the DMRS 225-a may be associated with the $\pi/2$ BPSK sequence and the first wireless device 205-a selects a gRS frequency tone location from one of the options described herein. In some cases, to avoid descrambling before phase jump estimation, the first wireless device 205-a may select a same symbol and a same subframe number for generation of the initial scrambling seed $c_{init}$ for the gRS 235-a that were used for the DMRS 225-a.

In some examples, subsampling the low PAPR DMRS sequence in the frequency domain may impact PAPR performance. Since the gRS 235-a may be low density, the PAPR performance impact may be limited. However, to ensure low PAPR gRS, the first wireless device 205-*a* may transmit the gRS 235-*a* using a different sequence than a sequence used to transmit the DMRS 225-*a*. For DFT-s-OFDM, the first wireless device 205-*a* may transmit the gRS 235-*a* using a type-1 low PAPR sequence, a post-DFT BPSK (e.g., π/2) sequence, or a random QPSK sequence. In some examples, the gRS 235-*a* may be configured with a sequence (e.g., via a standard or via control signaling). In examples where the first wireless device 205-*a* may transmit the gRS 235-*a* using the type-1 low PAPR sequence or the post-DFT π/2 BPSK sequence, the sequence length for sequence generation may be equal to a total quantity of resource elements associated with the gRS 235-*a*. In some examples, for a type-1 low PAPR sequence with a length less than or equal to 30, computer generated sequences of lengths 6, 12, 18, 24, and 30 may be supported (e.g., in NR). However, computer generated sequence support may be extended to more length options. In some cases, the first wireless device 205-*a* may select a closest supported length and truncate the selected sequence accordingly. In some examples, the first wireless device 205-*a* may align (e.g., at least partially overlap) one or more frequency tones for the gRS 235-*a* with one or more frequency tones of the DMRS 225-*a* so that the phase jump estimate at the second wireless device 205-*b* may be performed based on one gRS 235 and one DMRS 225 across the phase jump boundary 230 after applying a descrambling. In some other cases, the frequency tones of the gRS 235-*a* and the frequency tones of the DMRS 225-*a* may not align (e.g., may not partially overlap).

In some cases, for DFT-s-OFDM, the first wireless device 205-*a* may multiplex the PxSCH 220 together with the gRS 235-*a* in the first symbol 240-*a* by rate matching or puncturing the PxSCH 220 around the gRS 235-*a*. For example, the first wireless device 205-*a* (e.g., a transmitting device) may puncture the post-DFT PxSCH 220 around the gRS 235-*a* resource elements after transform precoding. In this case, the PxSCH 220 DFT size may be the same as the PxSCH 220 symbol (e.g., the first symbol 240-*a*) without the gRS 235-*a*. Puncturing may be a simple way to maintain the PAPR. However, puncturing any of the PxSCH 220 post-DFT modulation symbols at gRS 235-*a* symbols may impact the PxSCH 220 log likelihood ratios (LLRs) in the gRS symbol (e.g., the first symbol 240-*a*).

Additionally, or alternatively, the first wireless device 205-*a* may reduce a quantity of PxSCH 220 time domain modulation symbols (e.g., associated with the first shared data in the first slot 215-*a*) in the gRS symbol (e.g., the first symbol 240-*a*) and perform rate matching around one or more resource elements associated with the gRS 235-*a* after transform precoding. In some examples, the DFT transform precoding may restrict the quantity of input frequency tones to a value of $2^{\alpha} \cdot 3^{\beta} \cdot 5^{\gamma}$.

There may be at least two rate matching options for the first wireless device 205-*a*. In a first rate matching option, the first wireless device 205-*a* may reduce a quantity of QAM symbols in the time domain (e.g., to the nearest value of $2^{\alpha} \cdot 3^{\beta} \cdot 5^{\gamma}$) and may perform post-DFT rate matching for the first shared data (e.g., the PxSCH 220) around the first reference signal (e.g., the gRS 235-*a*), as described in more detail with reference to FIG. 5A. Since the transform pre-coded resource elements associated with the PxSCH 220 may be reduced to the next closest value of $2^{\alpha} \cdot 3^{\beta} \cdot 5^{\gamma}$, there may be marginal rate loss and a change in the size of DFT at the first symbol 240-*a*. In some examples, the first wireless device 205-*a* may rate match the DFT precoded resource elements associated with the PxSCH 220 in one or more remaining resource elements not occupied by the gRS 235-*a* in the first symbol 240-*a*.

In a second rate matching option, the first wireless device 205-*a* may allow a first quantity of resource elements (e.g., spillover resources) associated with the gRS 235-*a* to go outside of a PxSCH allocation (e.g., a legacy allocation) when there are a total of the first quantity of resource elements of gRS 235-*a* and may perform PxSCH 220 rate matching (e.g., post-DFT) around the gRS 235-*a*. That is, the first wireless device 205-*a* may transmit a quantity of resource elements of the first shared data (e.g., the PxSCH 220) in a frequency tone that is higher in frequency than a frequency allocation for the shared data, lower in frequency than the frequency allocation for the shared data, or both based on a quantity of resource elements of the first reference signal (e.g., the gRS 235-*a*), and may perform rate matching for the first shared data around the first reference signal, as described in more detail with reference to FIG. 5B. Since the quantity of gRS 235-*a* may be small (e.g., one resource element in every 48 frequency tones), a downlink control information (DCI) message may allocate additional resource blocks (e.g., one or two resource blocks on two sides of the FDRA at the first symbol 240-*a*, for the spillover resource elements associated with the PxSCH 220). In some cases, the transform precoded frequency domain symbols may be rate matched around the resource elements associated with the gRS 235-*a*.

In some examples, rather than post-DFT rate matching the PxSCH 220 around the preconfigured resources of the gRS 235-*a*, the first wireless device 205-*a* may rate match the gRS 235-*a* (e.g., the first reference signal) to one or more resource elements of the PxSCH 220 (e.g., the first shared data) in the first symbol 240-*a* in accordance with a pattern. For example, the first wireless device 205-*a* may allocate a quantity of preconfigured resource elements to the gRS 235-*a* and, from the remaining resource elements, may determine a next largest quantity of resource elements for the PxSCH 220 in terms of $2^{\alpha} \cdot 3^{\beta} \cdot 5^{\gamma}$. After placing the PxSCH resource elements in the gRS symbol (e.g., the first symbol 240-*a*), the gRS 235-*a* may be rate matched to the remaining resource elements with its own pattern. That is, in the gRS symbol (e.g., the first symbol 240-*a*), the PxSCH may choose a next largest quantity of resource elements in terms of $2^{\alpha} \cdot 3^{\beta} \cdot 5^{\gamma}$ to allow enough gRS resource elements, and the gRS 235-*a* may be rate matched to the remaining resource elements with a predefined pattern. For example, the first wireless device 205-*a* may rate match the gRS 235-*a* in one or more remaining resource elements with a comb 2 pattern.

While the wireless communications system 200 illustrates an example in which the phase jump boundary 230 is located in time after a first PxSCH 220 and before a second PxSCH 220, there may be other examples in which the phase jump boundary 230 is located after the start of the first PxSCH 220 and before the end of the first PxSCH 220, or in the middle of shared resources identified by a single SLIV associated with a PxSCH 220. That is, there may be first shared resources (e.g., a first PxSCH 220 or a first portion of a first PxSCH 220) followed in time by a phase jump boundary 230, followed in time by second shared resources (e.g., a second PxSCH 220 or a second portion of the first PxSCH 220). The embodiments, examples, and implementations described herein should not be construed as limiting.

Figure 3:
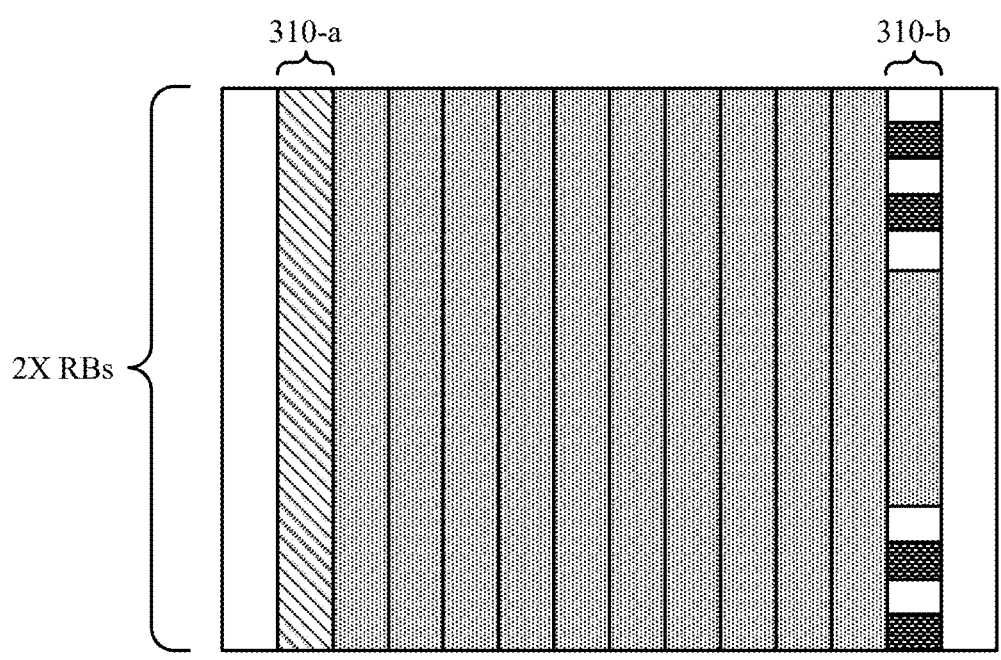
FIGS. 3, 4, 5A, and 5B show examples of resource diagrams that support glue reference signals for joint channel estimation across a phase jump boundary in accordance with one or more aspects of the present disclosure.
Figure 3:
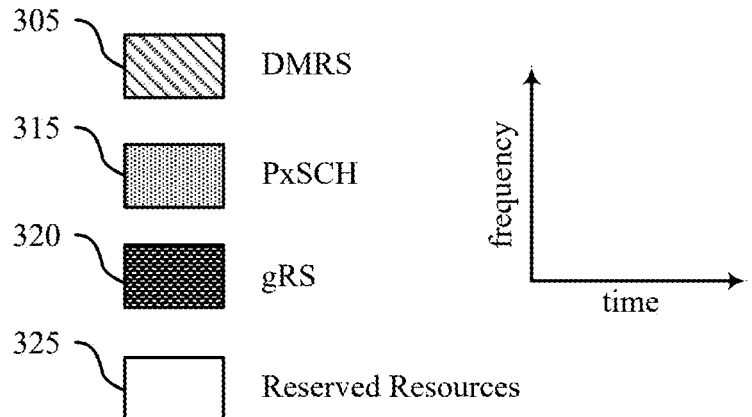

FIG. 3 shows an example of a resource diagram 300 that supports glue reference signals for joint channel estimation across a phase jump boundary in accordance with one or more aspects of the present disclosure. The resource diagram

300 may implement or be implemented by one or more aspects of the wireless communications system 100 and the wireless communications system 200 described with reference to FIGS. 1 and 2, respectively. For example, the resource diagram 300 may be implemented by a network entity 105 and a UE 115 as described with reference to FIG. 1 or by a first wireless device 205-*a* and a second wireless device 205-*b* as described with reference to FIG. 2 to support joint channel estimation across a phase jump boundary.

For example, the resource diagram 300 may illustrate a slot (e.g., the first slot 215-*a* described with reference to FIG. 2) in which a first wireless device (e.g., a transmitting device, such as the first wireless device 205-*a*) may transmit a DMRS 305 in a first symbol 310-*a* and a PxSCH 315 in one or more other symbols 310. There may be a phase change boundary after a second symbol 310-*b* at the end of the slot in time. Thus, to help a receiving device (e.g., the second wireless device 205-*b* described with reference to FIG. 2) to estimate the phase change and perform joint channel estimation, the first wireless device may transmit a gRS 320 in the last symbol 310-*b* before the phase jump boundary. One or more other resources in the slot shown by the resource diagram 300 may be occupied by one or more reserved resources 325, which may be reserved for uplink, downlink, or sidelink control signaling or for another purpose.

The first wireless device may determine a tone location for the post-DFT gRS waveform. Across the phase jump boundary, two post-DFT reference signal symbols sharing the same frequency tone locations may result in improved phase jump estimation in a frequency selective channel, compared to two post-DFT reference signal symbols with differing frequency tone locations. For example, the second wireless device may take the difference between a first set of frequency tones associated with the gRS 320 and a second set of frequency tones associated with a DMRS after the phase jump boundary (e.g., which may be similar to the DMRS 305) and compute the phase difference across the phase jump boundary. If the gRS 320 waveform shares the same frequency tone locations as the DMRS 305 (e.g., the first wireless device transmits the gRS 320 using a first set of frequency tones that at least partially overlap with a second set of frequency tones used to transmit the DMRS 305, or the first set of frequency tones are a subset of the second set of frequency tones), the second wireless device may directly compute the phase jump across the phase jump boundary.

The first wireless device may select the gRS 320 tone locations (e.g., the frequency resources used to transmit the gRS 320 in the second symbol 310-*b*) in one of several methods. For example, avoid disturbing the frequency tone structure of the DFT-s PxSCH 315 and to preserve the low PAPR property of the DFT-s PxSCH 315, the first wireless device may place the gRS 320 at the edge of the PxSCH 315 (e.g., one or both edges). In some implementations, for DFT-s-OFDM, the first wireless device may transmit the gRS 320 at the edge resource blocks of the PxSCH 315 and align with the DMRS 305 frequency tones. That is, the first wireless device may transmit a first reference signal (e.g., the gRS 320) in one or more edge resource blocks of the second symbol 310-*b*, where one or more frequency tones of the first reference signal may align (e.g., partially overlap) with one or more frequency tones of a second reference signal (e.g., the DMRS 305, or a corresponding DMRS after the phase jump boundary that may share frequency tones with the DMRS 305).

The one or more edge resource blocks of the second symbol 310-*b* may be located within a threshold frequency range relative to a frequency boundary (e.g., an upper frequency boundary, a lower frequency boundary, or both) of first shared resources (e.g., the PxSCH 315 in the slot). For example, in the resource diagram 300, the edge resource blocks may be within four resource elements from an upper frequency boundary and within four resource elements from a lower frequency boundary within the second symbol 310-*b*. In some examples, the first wireless device may receive a control message indicating a quantity (e.g., X) of the one or more edge resource blocks. For example, a device or a standard may configure the quantity of edge resource blocks to be one, two, or four resource blocks, such that a quantity of gRS resource elements may be transmitted in every other edge resource block, in every two edge resource blocks, or in every four edge resource blocks, respectively. In other words, the first wireless device may transmit the gRS 320 in a comb pattern at one or more frequency edges of the second symbol 310-*b*. In some examples, a frequency allocation for the PxSCH 315 may be a quantity of resource blocks equal to twice the quantity of edge resource blocks (e.g., 2× resource blocks). The first wireless device may place the resource elements of the gRS 320 at the edge resource blocks of the PxSCH 315 in the second symbol 310-*b*, with one or more contiguous frequency tones for the PxSCH 315 in the center-frequency tones to maintain a low PAPR property.

The resource elements of the gRS 320 may occupy one or more frequency tones that are the same as, partially overlapping with, or aligned with one or more frequency tones associated with the DMRS 305 per resource block. While the resource diagram 300 depicts the resource elements of the gRS 320 occupying both a relatively high-frequency edge and a relatively low-frequency edge, in some examples, the gRS 320 resource elements may occupy only one of the relatively high-frequency edge or the relatively low-frequency edge of the PxSCH 315 in the second symbol 310-*b*. In such examples, the DFT-s PxSCH 315 may be contiguous in the frequency domain and may retain a low PAPR. In some examples, the gRS 320 resource elements may occupy both the high-frequency edge and the low-frequency edge for improved frequency diversity and improved phase ramp change estimation. For example, in a high-bandwidth scenario, the low-frequency edge may experience some fading, the gRS 320 at the high-frequency edge may compensate for the fading.

In some examples, to maintain low overhead for the gRS 320, a threshold configuration for a quantity of frequency tones (e.g., 12 tones) may be configured based on a modulation and coding scheme (MCS) (e.g., regardless of a resource allocation). A relatively high MCS may be associated with an improved phase jump estimate and a higher quantity of gRS frequency tones. The first wireless device may be configured with one or more MCS thresholds, where the first wireless device may use a first quantity of gRS frequency tones based on not exceeding an MCS threshold and may use a second quantity of gRS frequency tones based on exceeding the MCS threshold.

In some examples, the first wireless device may rate match the gRS 320 (e.g., the first reference signal) to one or more resource elements of the PxSCH 315 (e.g., the first shared data) in the second symbol 310-*b* in accordance with a pattern (e.g., a comb pattern). For example, the first wireless device may allocate a quantity of preconfigured resource elements to the gRS 320 and, from the remaining resource elements, may determine a next largest quantity of resource elements for the PxSCH 315 in terms of $2^{\alpha} \cdot 3^{\beta} \cdot 5^{\gamma}$. After placing the PxSCH resource elements in the gRS symbol (e.g., the second symbol 310-*b* that is adjacent to and before the phase jump boundary), the gRS 320 may be rate matched to the remaining resource elements with its own pattern. That is, in the second symbol 310-*b*, the PxSCH 315 may choose a next largest quantity of resource elements in terms of $2^{\alpha} \cdot 3^{\beta} \cdot 5^{\gamma}$ to allow enough gRS resource elements, and the gRS 320 may be rate matched to the remaining resource elements with a predefined pattern. For example, the first wireless device may rate match the gRS 320 in one or more remaining resource elements with a comb 2 pattern, as shown in the resource diagram 300.

While the resource diagram 300 illustrates an example in which the phase jump boundary is located in time after the PxSCH 315, there may be other examples in which the phase jump boundary is located after the start of the PxSCH 315 and before the end of the PxSCH 315, or in the middle of shared resources identified by a single SLIV associated with the PxSCH 315. That is, there may be first shared resources (e.g., a first PxSCH 315 or a first portion of a first PxSCH 315) followed in time by a phase jump boundary, followed in time by second shared resources (e.g., a second PxSCH 315 or a second portion of the first PxSCH 315). The embodiments, examples, and implementations described herein should not be construed as limiting.

Figure 4:
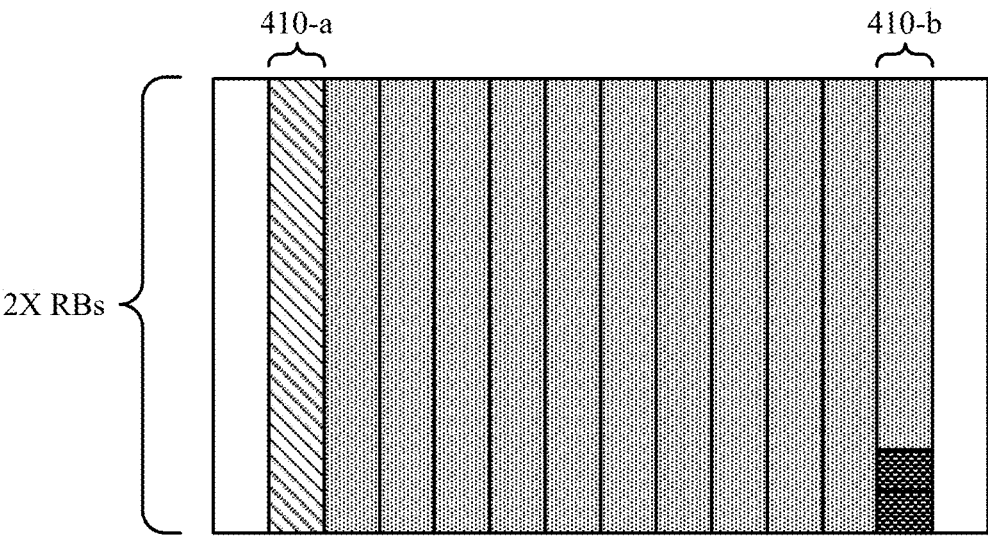
Figure 4:
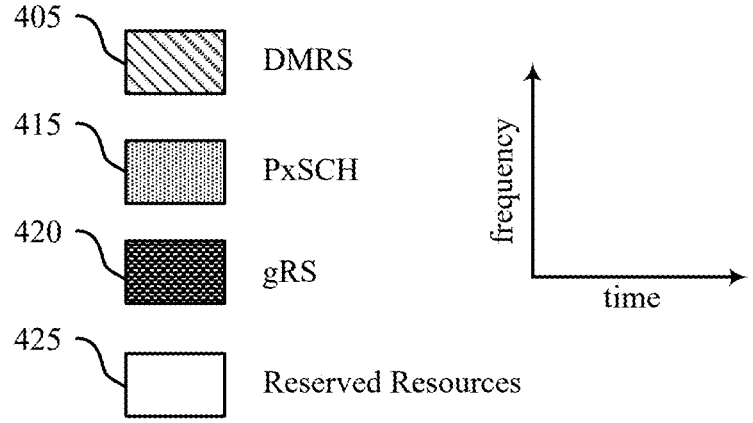

FIG. 4 shows an example of a resource diagram 400 that supports glue reference signals for joint channel estimation across a phase jump boundary in accordance with one or more aspects of the present disclosure. The resource diagram 400 may implement or be implemented by one or more aspects of the wireless communications system 100 and the wireless communications system 200 described with reference to FIGS. 1 and 2, respectively. For example, the resource diagram 400 may be implemented by a network entity 105 and a UE 115 as described with reference to FIG. 1 or by a first wireless device 205-*a* and a second wireless device 205-*b* as with reference to FIG. 2 to support joint channel estimation across a phase jump boundary.

For example, the resource diagram 400 may illustrate a slot (e.g., the first slot 215-*a* described with reference to FIG. 2) in which a first wireless device (e.g., a transmitting device, such as the first wireless device 205-*a*) may transmit a DMRS 405 in a first symbol 410-*a* and a PxSCH 415 in one or more other symbols 410. There may be a phase change boundary after a second symbol 410-*b* at the end of the slot in time. Thus, to help a receiving device (e.g., the second wireless device 205-*b* described with reference to FIG. 2) to estimate the phase change and perform joint channel estimation, the first wireless device may transmit a gRS 420 in the last symbol 410-*b* before the phase jump boundary. One or more other resources in the slot shown by the resource diagram 400 may be occupied by one or more reserved resources 425, which may be reserved for uplink, downlink, or sidelink control signaling or for another purpose.

The first wireless device may select the gRS 420 tone locations (e.g., the frequency resources used to transmit the gRS 420 in the second symbol 410-*b*) in one of several methods. For example, as an alternative to the tone location described with reference to FIG. 3, for DFT-s-OFDM, the first wireless device may transmit the gRS 420 in one or more edge resource blocks of the PxSCH 415 and in one or more contiguous frequency tones. That is, the first wireless device may transmit, in the second symbol 410-*b*, a first reference signal (e.g., the gRS 420) in one or more edge resource blocks of the first shared resources (e.g., the PxSCH 415) in one or more contiguous frequency tones, where the one or more contiguous frequency tones may be located within a threshold frequency range relative to a frequency boundary of the first shared resources. For example, the resource diagram 400 illustrates the resource elements of the gRS 420 located within two frequency tones of a lower frequency boundary. A quantity of gRS resource elements, a quantity of resource blocks (e.g., X) in which to include the quantity of gRS resource elements, or both may be preconfigured (e.g., in a standard or via control signaling received from another device). In some examples, a frequency allocation of the PxSCH 415 may be equal to twice the quantity of resource blocks X (e.g., 2× resource blocks). The gRS resource elements may be placed at the edge resource blocks of the PxSCH 415 and may occupy contiguous frequency tones (e.g., not in a comb pattern). In some examples, placement of the gRS 420 in one or two edges in FDRA may be possible. That is, while the resource diagram 400 illustrates an example in which the gRS 420 is transmitted in resource elements at a single frequency edge (e.g., the lower frequency edge), there may be other examples in which the gRS 420 is transmitted in the higher frequency edge, or in both the lower frequency edge and the higher frequency edge. In some examples, the frequency tones of the gRS 420 may be different from the frequency tones of the DMRS 405 (e.g., which may share frequency tones with a DMRS after the phase jump boundary).

While the resource diagram 400 illustrates an example in which the phase jump boundary is located in time after the PxSCH 415, there may be other examples in which the phase jump boundary is located after the start of the PxSCH 415 and before the end of the PxSCH 415, or in the middle of shared resources identified by a single SLIV associated with the PxSCH 415. That is, there may be first shared resources (e.g., a first PxSCH 415 or a first portion of a first PxSCH 415) followed in time by a phase jump boundary, followed in time by second shared resources (e.g., a second PxSCH 415 or a second portion of the first PxSCH 415). The embodiments, examples, and implementations described herein should not be construed as limiting.

Figures 5A, 5B:
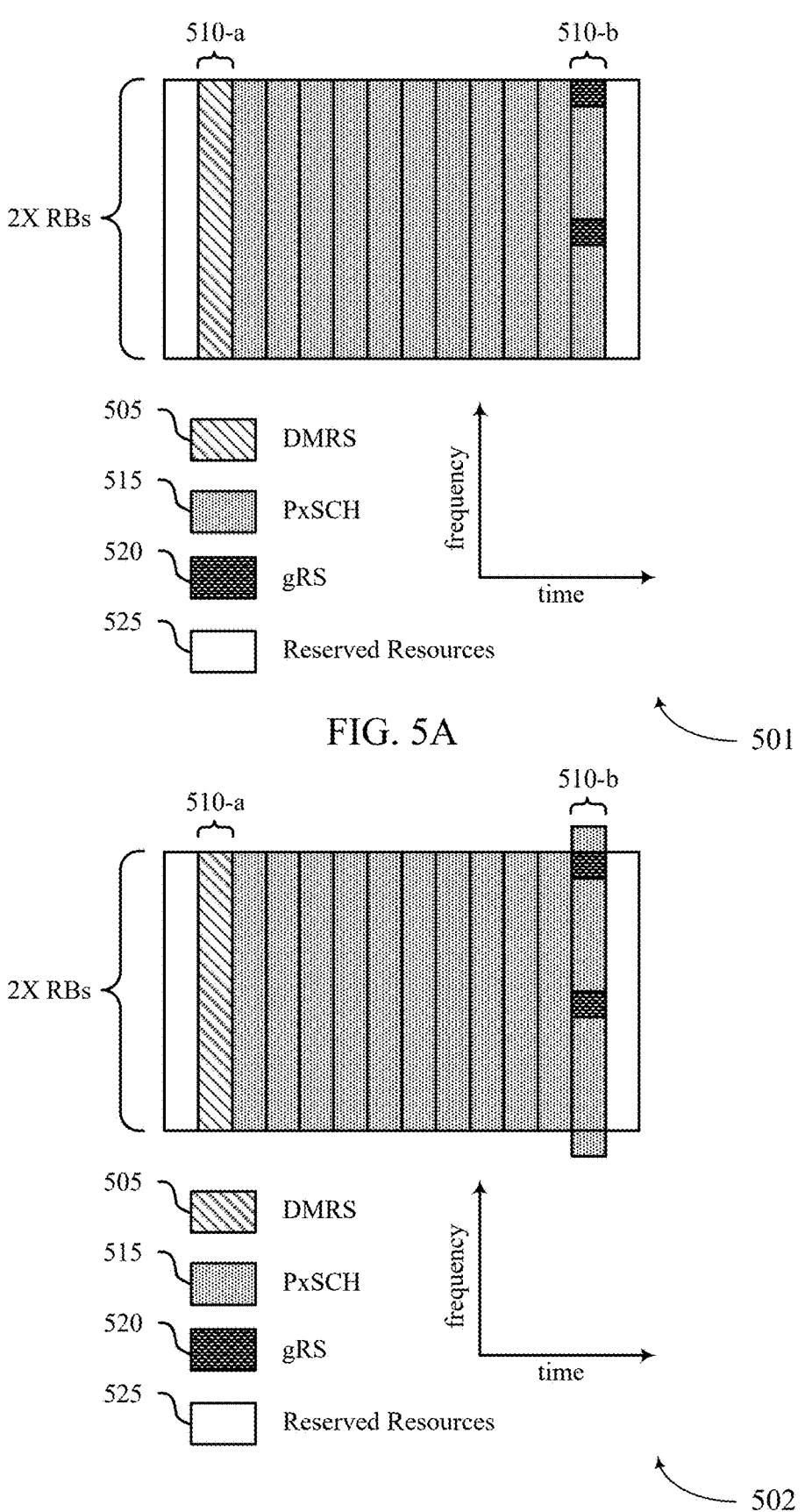

FIGS. 5A and 5B show examples of resource diagrams 501 and 502, respectively, that support glue reference signals for joint channel estimation across a phase jump boundary in accordance with one or more aspects of the present disclosure. The resource diagrams 501 and 502 may implement or be implemented by one or more aspects of the wireless communications system 100 and the wireless communications system 200 described with reference to FIGS. 1 and 2, respectively. For example, the resource diagrams 501 and 502 may be implemented by a network entity 105 and a UE 115 as described with reference to FIG. 1 or by a first wireless device 205-*a* and a second wireless device 205-*b* as with reference to FIG. 2 to support joint channel estimation across a phase jump boundary.

For example, the resource diagrams 501 and 502 may each illustrate a slot (e.g., the first slot 215-*a* described with reference to FIG. 2) in which a first wireless device (e.g., a transmitting device, such as the first wireless device 205-*a*) may transmit a DMRS 505 in a first symbol 510-*a* and a PxSCH 515 in one or more other symbols 510. There may be a phase change boundary after a second symbol 510-*b* at the end of the slot in time. Thus, to help a receiving device (e.g., the second wireless device 205-*b* described with reference to FIG. 2) to estimate the phase change and perform joint channel estimation, the first wireless device may transmit a gRS 520 in the last symbol 510-*b* before the phase jump boundary. One or more other resources in the slot shown by the resource diagrams 501 and 502 may be occupied by one or more reserved resources 525, which may be reserved for uplink, downlink, or sidelink control signaling or for another purpose.

In some implementations, the first wireless device may reduce a quantity of PxSCH 515 time domain modulation symbols (e.g., associated with first shared data in the slot) in the gRS symbol (e.g., the second symbol 510-b) and perform rate matching around one or more resource elements associated with the gRS 520 after transform precoding. In some examples, the DFT transform precoding may restrict the quantity of input frequency tones to a value of $2^{\alpha}\cdot3^{\beta}\cdot5^{\gamma}$.

There may be at least two rate matching options for the first wireless device, as illustrated by the resource diagram 501 and the resource diagram 502, respectively. In a first rate matching option illustrated by the resource diagram 501, the first wireless device may reduce a quantity of QAM symbols in the time domain (e.g., to the nearest value of $2^{\alpha}\cdot3^{\beta}\cdot5^{\gamma}$) and may perform post-DFT rate matching for the first shared data (e.g., the PxSCH 515) around a first reference signal (e.g., the gRS 520). Since the transform precoded resource elements associated with the PxSCH 515 may be reduced to the next closest value of $2^{\alpha}\cdot3^{\beta}\cdot5^{\gamma}$, there may be marginal rate loss and a change in the size of DFT at the second symbol 510-b. In some examples, the first wireless device may rate match the DFT precoded resource elements associated with the PxSCH 515 in one or more remaining resource elements not occupied by the gRS 520 in the second symbol 510-b.

In a second rate matching option illustrated by the resource diagram 501, the first wireless device may allow a first quantity of resource elements (e.g., spillover resources) associated with the gRS 520 to go outside of a PxSCH allocation (e.g., a legacy allocation) when there are a total of the first quantity of resource elements of gRS 520 and may perform PxSCH 515 rate matching (e.g., post-DFT) around the gRS 520. That is, the first wireless device may transmit a quantity of resource elements of the first shared data (e.g., the PxSCH 515) in a frequency tone that is higher in frequency than a frequency allocation for the shared data, lower in frequency than the frequency allocation for the shared data, or both based on a quantity of resource elements of the first reference signal (e.g., the gRS 520), and may perform rate matching for the first shared data around the first reference signal. Although the resource diagram 502 illustrates an example in which the first wireless device transmits the PxSCH 515 in frequency tones that are both higher in frequency and lower in frequency than the frequency allocation, there may be examples in which the first wireless device transmits the PxSCH 515 in frequency tones that are either higher in frequency or lower in frequency than the frequency allocation for the shared data. Since the quantity of gRS 520 may be small (e.g., one resource element in every 48 frequency tones), a DCI message may allocate additional resource blocks (e.g., one or two resource blocks on two sides of the FDRA at the second symbol 510-b, for the spillover resource elements associated with the PxSCH 515). In some cases, the transform precoded frequency domain symbols may be rate matched around the resource elements associated with the gRS 520.

While the resource diagram 501 and the resources diagram 502 illustrate examples in which the phase jump boundary is located in time after the PxSCH 515, there may be other examples in which the phase jump boundary is located after the start of the PxSCH 515 and before the end of the PxSCH 515, or in the middle of shared resources identified by a single SLIV associated with the PxSCH 515. That is, there may be first shared resources (e.g., a first PxSCH 515 or a first portion of a first PxSCH 515) followed in time by a phase jump boundary, followed in time by second shared resources (e.g., a second PxSCH 515 or a second portion of the first PxSCH 515). The embodiments, examples, and implementations described herein should not be construed as limiting.

Figure 6:
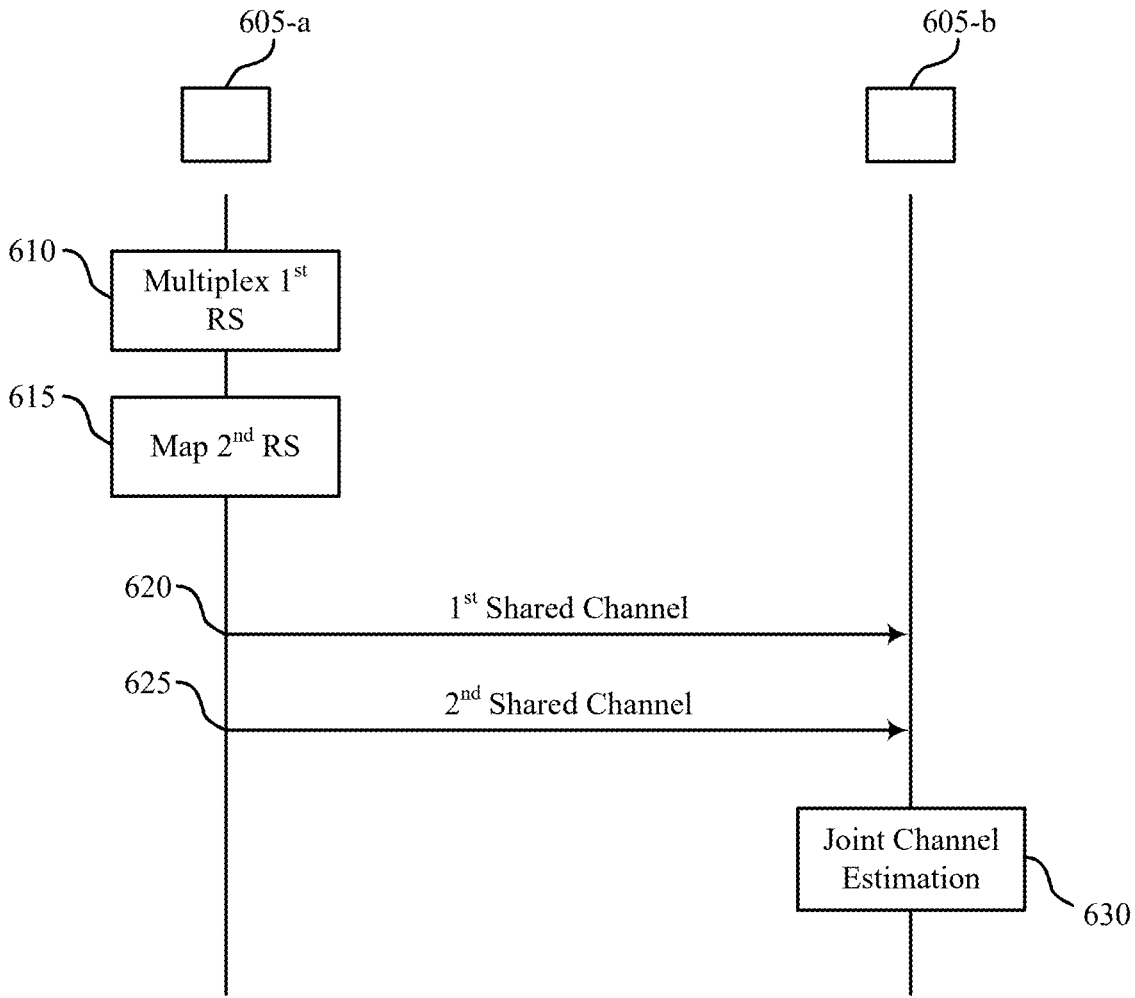
FIG. 6 shows an example of a process flow that supports glue reference signals for joint channel estimation across a phase jump boundary in accordance with one or more aspects of the present disclosure.

FIG. 6 shows an example of a process flow 600 that supports glue reference signals for joint channel estimation across a phase jump boundary in accordance with one or more aspects of the present disclosure. In some examples, the process flow 600 may be implemented by, or may implement aspects of, the wireless communications systems 100 and 200 and the resource diagrams 300, 400, 501, and 502. For example, the process flow 600 includes a first wireless device 605-a (e.g., a transmitting device) and a second wireless device 605-b (e.g., a receiving device), which may each be examples of a UE 115, a network entity 105, or another type of device described with reference to FIGS. 1 and 2. Following the process flow 600, the second wireless device 605-b may perform joint channel estimation across a phase jump boundary for DFT-s-OFDM. Alternative examples of the following may be implemented, where some steps are performed in a different order than described or are not performed at all. In some cases, steps may include additional features not mentioned below, or further steps may be added. Although the first wireless device 605-a and the second wireless device 605-b are shown performing the operations of the process flow 600, some aspects of some operations may also be performed by one or more other wireless devices.

At 610, the first wireless device 605-a may multiplex, in the frequency domain and in a first symbol that is adjacent to and before a phase jump boundary in time, a first reference signal with first shared data in first shared resources (e.g., a first PxSCH, which may be a first PDSCH, PUSCH, or PSSCH, or a first portion of a first PxSCH). The first reference signal may be referred to as a gRS that allows the second wireless device 605-b to perform joint channel estimation across the phase jump boundary.

At 615, the first wireless device 605-a may map, to a second symbol that is adjacent to and after the phase jump boundary, a second reference signal associated with second shared resources (e.g., a second PxSCH or a second portion of the first PxSCH). The second reference signal may be a gRS or a DMRS.

At 620, the first wireless device 605-a may transmit, to the second wireless device 605-b and via the first shared resources, the first reference signal multiplexed with the first shared data according to a DFT-s-OFDM scheme. The first wireless device 605-a may transmit the first reference signal according to a resource block pattern. For example, the first wireless device 605-a may transmit the first reference signal in a first quantity of resource elements according to a first resource block pattern, where the first quantity of resource elements may be based on one or more orthogonal cover codes associated with the second reference signal. In some examples, one or more frequency tones of the first reference signal may align with one or more frequency tones of the second reference signal (e.g., based on subsampling the one or more frequency tones of the second reference signal).

In some examples, the first wireless device 605-a may transmit, in one or more edge resource blocks of the first symbol, the first reference signal (e.g., the gRS). In such examples, the one or more frequency tones of the first reference signal may align (e.g., at least partially overlap in the frequency domain) with the one or more frequency tones of the second reference signal (e.g., DMRS). In some cases, the first wireless device 605-*a* may receive a control message (e.g., before multiplexing the first reference signal with the first shared data) indicating a quantity of the one or more edge resource blocks (e.g., one resource block, two resource blocks, or four resource blocks). In some cases, the second wireless device 605-*b* may receive a control message indicating the quantity of the one or more edge resource blocks. The one or more edge resource blocks of the first symbol may be located within a threshold frequency range relative to a frequency boundary of the first shared resources. That is, the one or more edge resource blocks may be associated with one or more highest frequency tones, one or more lowest frequency tones, or both in the first symbol. In some examples, the first wireless device 605-*a* may transmit, in the first symbol, the first reference signal in one or more edge resource blocks of the first shared resources in one or more contiguous frequency tones, where the one or more contiguous frequency tones may be located within a threshold frequency range relative to a frequency boundary of the first shared resources.

In some examples, the first wireless device 605-*a* may transmit the first reference signal with (e.g., using) a sequence. For example, the first wireless device 605-*a* may subsample a type-1 low PAPR sequence associated with the second reference signal and transmit the first reference signal using the subsampled type-1 low PAPR sequence. In some cases (e.g., if sequence hopping is enabled), the first wireless device 605-*a* may generate an initial scrambling seed value for the first reference signal based on a same symbol and a same subframe number associated with the second reference signal. That is, the first wireless device 605-*a* may select the same symbol and the same subframe number to generate an initial scrambling seed value for the first reference signal that was used to generate an initial scrambling seed value for the second reference signal to ensure that the first reference signal (e.g., gRS) uses the same sequence as the second reference signal (e.g., gRS or DMRS) across the phase jump boundary. Additionally, or alternatively, the first wireless device 605-*a* may transmit the first reference signal using a subsampled post-DFT BPSK sequence, where the post-DFT BPSK sequence is the same sequence as the second reference signal. Additionally, or alternatively, the first wireless device 605-*a* may transmit the first reference signal using a type-1 low PAPR sequence, a post-DFT BPSK sequence, or a random QPSK sequence.

In some examples, the first wireless device 605-*a* may puncture the first shared data (e.g., post-DFT PxSCH) around the first reference signal (e.g., gRS resource elements) after transform precoding. In some cases, the first wireless device 605-*a* may reduce a quantity of time domain modulation symbols associated with the first shared data in the first symbol and perform rate matching around one or more resource elements associated with the first reference signal after transform precoding. For example, DFT transform precoding may allow the quantity of input tones to be $2^{\alpha} \cdot 3^{\beta} \cdot 5^{\gamma}$. For example, the first wireless device 605-*a* may reduce a quantity of QAM symbols in the time domain (e.g., to the nearest quantity that satisfies $2^{\alpha} \cdot 3^{\beta} \cdot 5^{\gamma}$) and may perform post-DFT rate matching for the first shared data around the first reference signal. As another example, the first wireless device 605-*a* may transmit a quantity of resource elements of the first shared data in a frequency tone that is higher in frequency than a frequency allocation for the shared data, lower in frequency than the frequency allocation for the shared data, or both based on a quantity of resource elements of the first reference signal and perform rate matching for the first shared data around the first reference signal. In some examples, the first wireless device 605-*a* may rate match the first reference signal to one or more resource elements of the first shared data in the first symbol in accordance with a pattern. For example, the first wireless device 605-*a* may rate match the first reference signal to one or more remaining resource elements after a next largest quantity of resource elements in terms of $2^{\alpha} \cdot 3^{\beta} \cdot 5^{\gamma}$ are used for the first shared data to allow enough resource elements for the first reference signal.

At 625, the first wireless device 605-*a* may transmit, to the second wireless device 605-*b* and via the second shared resources, the second reference signal according to the DFT-s-OFDM scheme. In some examples, the first wireless device 605-*a* may transmit the second reference signal (e.g., a DMRS, or a second gRS) using a same sequence used to transmit the first reference signal (e.g., a first gRS). In other examples, the sequence used to transmit the second reference signal may be different than the sequence used to transmit the first reference signal. In some examples, one or more frequency tones used to transmit the second reference signal may be the same as, similar to, or partially overlapping with one or more frequency tones used to transmit the first reference signal. In other examples, the frequency tones used to transmit the second reference signal may be different from (e.g., nonoverlapping with) one or more frequency tones used to transmit the first reference signal.

At 635, the second wireless device 605-*b* may perform joint channel estimation using a first phase estimate associated with the first symbol and using a second phase estimate associated with the second symbol based on the first reference signal received at 620 and based on the second reference signal received at 625.

Figure 7:
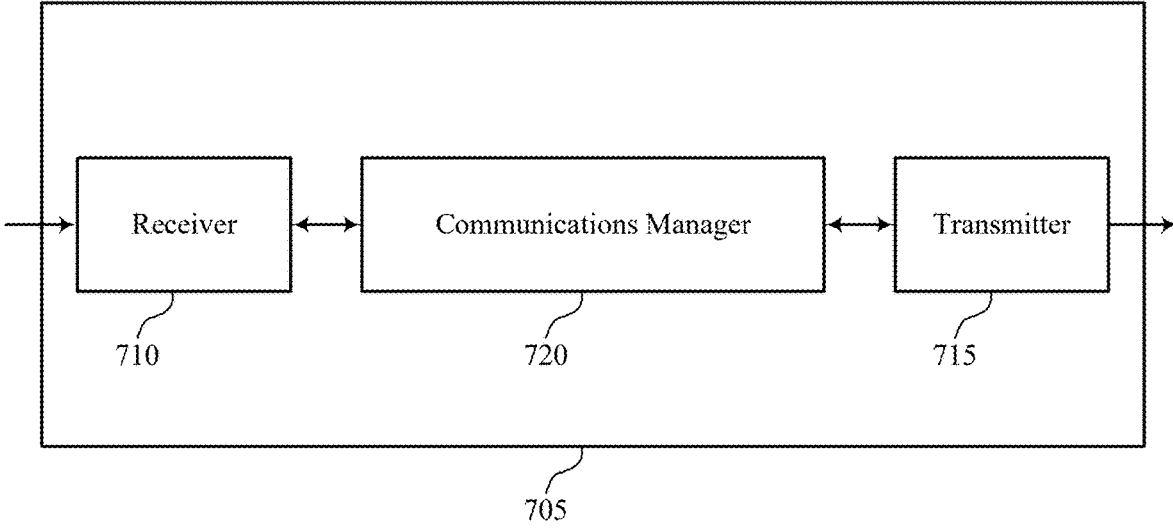
FIGS. 7 and 8 show block diagrams of devices that support glue reference signals for joint channel estimation across a phase jump boundary in accordance with one or more aspects of the present disclosure.

FIG. 7 shows a block diagram 700 of a device 705 that supports glue reference signals for joint channel estimation across a phase jump boundary in accordance with one or more aspects of the present disclosure. The device 705 may be an example of aspects of a UE 115 or a network entity 105 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to glue reference signals for joint channel estimation across a phase jump boundary). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to glue reference signals for joint channel estimation across a phase jump boundary). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations or components thereof may be examples of means for performing various aspects of glue reference signals for joint channel estimation across a phase jump boundary as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor (e.g., referred to as a processor-executable code). If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for multiplexing, in a frequency domain and in a first symbol that is adjacent to and before a phase jump boundary in time, a first reference signal with first shared data in first shared resources. The communications manager 720 is capable of, configured to, or operable to support a means for mapping, to a second symbol that is adjacent to and after the phase jump boundary in time, a second reference signal associated with second shared resources. The communications manager 720 is capable of, configured to, or operable to support a means for transmitting, via the first shared resources, the first reference signal multiplexed with the first shared data according to a DFT-s-OFDM scheme. The communications manager 720 is capable of, configured to, or operable to support a means for transmitting, via the second shared resources, the second reference signal according to the DFT-s-OFDM scheme.

Additionally, or alternatively, the communications manager 720 may support wireless communications in accordance with examples as disclosed herein. For example, the communications manager 720 is capable of, configured to, or operable to support a means for receiving, via first shared resources and according to a DFT-s-OFDM scheme, a first reference signal multiplexed, in a frequency domain and in a first symbol that is adjacent to and before a phase jump boundary in time, with first shared data. The communications manager 720 is capable of, configured to, or operable to support a means for receiving, via second shared resources and according to the DFT-s-OFDM scheme, a second reference signal in a second symbol that is adjacent to and after the phase jump boundary. The communications manager 720 is capable of, configured to, or operable to support a means for performing joint channel estimation using a first phase estimate associated with the first symbol and using a second phase estimate associated with the second symbol based on the first reference signal and on the second reference signal.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced processing and reduced overhead.

Figure 8:
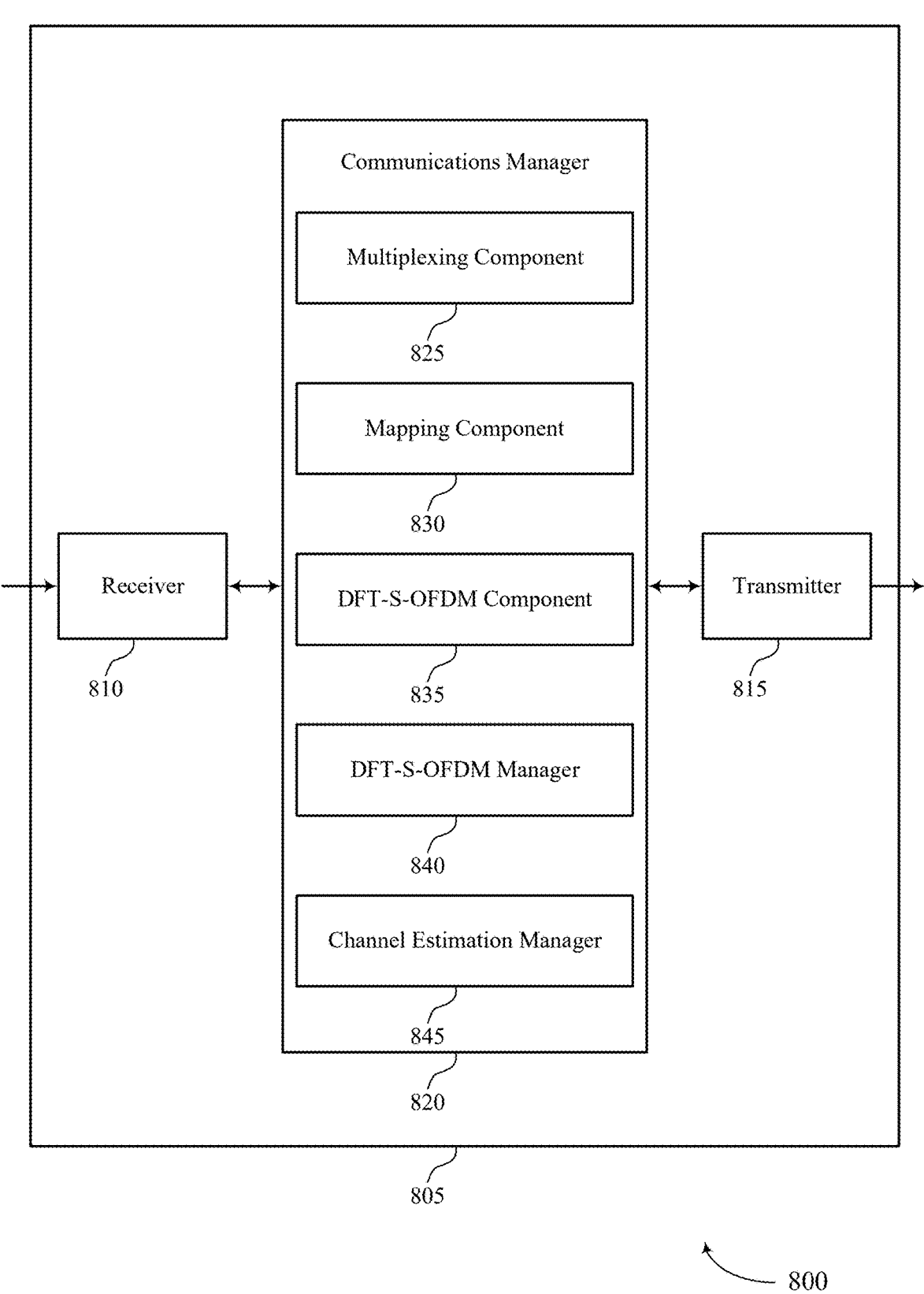

FIG. 8 shows a block diagram 800 of a device 805 that supports glue reference signals for joint channel estimation across a phase jump boundary in accordance with one or more aspects of the present disclosure. The device 805 may be an example of aspects of a device 705, a UE 115, or a network entity 105 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to glue reference signals for joint channel estimation across a phase jump boundary). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to glue reference signals for joint channel estimation across a phase jump boundary). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of glue reference signals for joint channel estimation across a phase jump boundary as described herein. For example, the communications manager 820 may include a multiplexing component 825, a mapping component 830, a DFT-s-OFDM component 835, a DFT-s-OFDM manager 840, a channel estimation manager 845, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The multiplexing component 825 is capable of, configured to, or operable to support a means for multiplexing, in a frequency domain and in a first symbol that is adjacent to and before a phase jump boundary in time, a first reference signal with first shared data in first shared resources. The mapping component 830 is capable of, configured to, or operable to support a means for mapping, to a second symbol that is adjacent to and after the phase jump boundary in time, a second reference signal associated with second shared resources. The DFT-s-OFDM component 835 is capable of, configured to, or operable to support a means for transmitting, via the first shared resources, the first reference signal multiplexed with the first shared data according to a DFT-s-OFDM scheme. The DFT-s-OFDM component 835 is capable of, configured to, or operable to support a means for transmitting, via the second shared resources, the second reference signal according to the DFT-s-OFDM scheme.

Additionally, or alternatively, the communications manager 820 may support wireless communications in accordance with examples as disclosed herein. The DFT-s-OFDM manager 840 is capable of, configured to, or operable to support a means for receiving, via first shared resources and according to a DFT-s-OFDM scheme, a first reference signal multiplexed, in a frequency domain and in a first symbol that is adjacent to and before a phase jump boundary in time, with first shared data. The DFT-s-OFDM manager 840 is capable of, configured to, or operable to support a means for receiving, via second shared resources and according to the DFT-s-OFDM scheme, a second reference signal in a second symbol that is adjacent to and after the phase jump boundary. The channel estimation manager 845 is capable of, configured to, or operable to support a means for performing joint channel estimation using a first phase estimate associated with the first symbol and using a second phase estimate associated with the second symbol based on the first reference signal and on the second reference signal.

Figure 9:
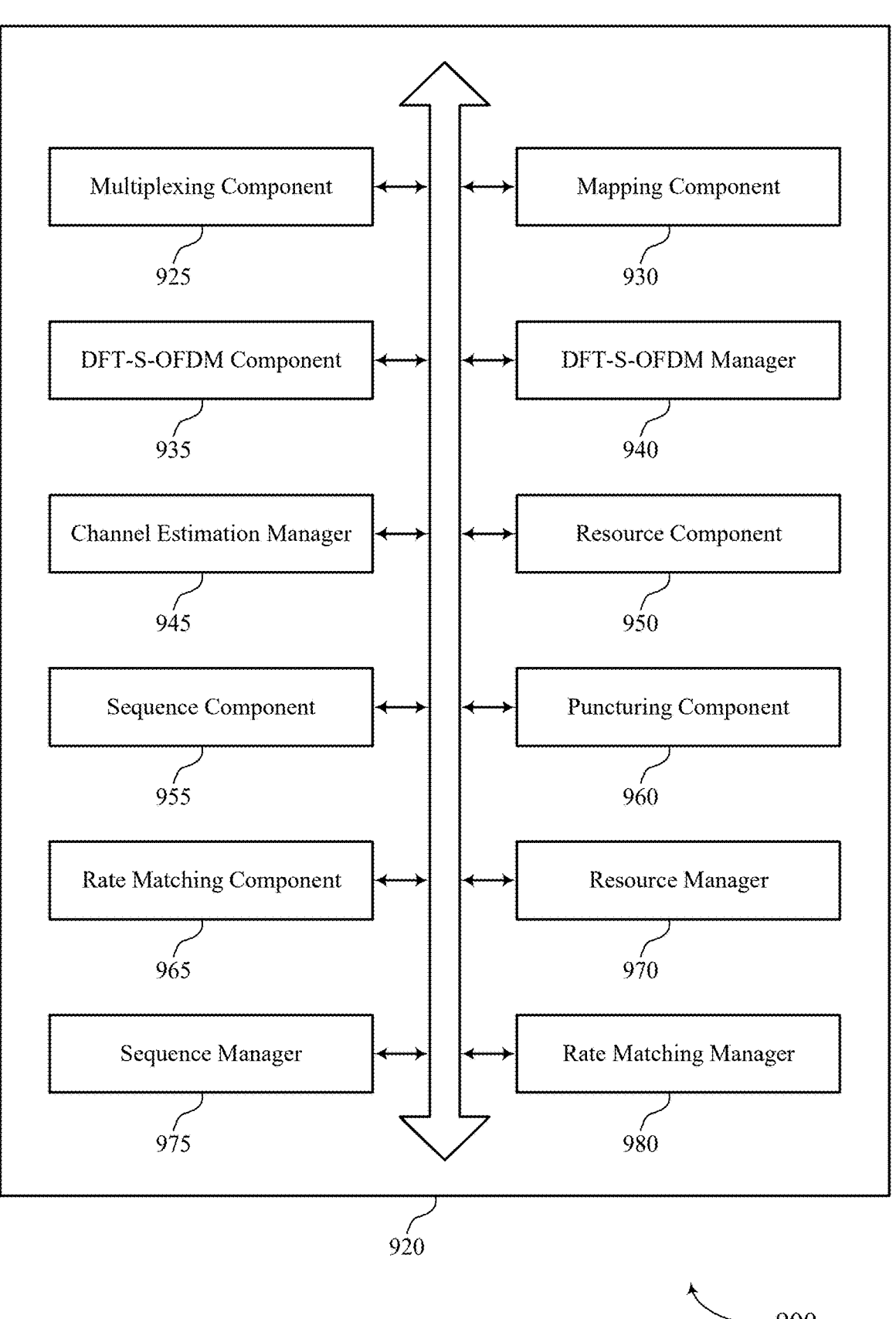
FIG. 9 shows a block diagram of a communications manager that supports glue reference signals for joint channel estimation across a phase jump boundary in accordance with one or more aspects of the present disclosure.

FIG. 9 shows a block diagram 900 of a communications manager 920 that supports glue reference signals for joint channel estimation across a phase jump boundary in accordance with one or more aspects of the present disclosure. The communications manager 920 may be an example of aspects of a communications manager 720, a communications manager 820, or both, as described herein. The communications manager 920, or various components thereof, may be an example of means for performing various aspects of glue reference signals for joint channel estimation across a phase jump boundary as described herein. For example, the communications manager 920 may include a multiplexing component 925, a mapping component 930, a DFT-s-OFDM component 935, a DFT-s-OFDM manager 940, a channel estimation manager 945, a resource component 950, a sequence component 955, a puncturing component 960, a rate matching component 965, a resource manager 970, a sequence manager 975, a rate matching manager 980, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communications in accordance with examples as disclosed herein. The multiplexing component 925 is capable of, configured to, or operable to support a means for multiplexing, in a frequency domain and in a first symbol that is adjacent to and before a phase jump boundary in time, a first reference signal with first shared data in first shared resources. The mapping component 930 is capable of, configured to, or operable to support a means for mapping, to a second symbol that is adjacent to and after the phase jump boundary in time, a second reference signal associated with second shared resources. The DFT-s-OFDM component 935 is capable of, configured to, or operable to support a means for transmitting, via the first shared resources, the first reference signal multiplexed with the first shared data according to a DFT-s-OFDM scheme. In some examples, the DFT-s-OFDM component 935 is capable of, configured to, or operable to support a means for transmitting, via the second shared resources, the second reference signal according to the DFT-s-OFDM scheme.

In some examples, to support transmitting the first reference signal, the resource component 950 is capable of, configured to, or operable to support a means for transmitting, in the first symbol, the first reference signal in a first quantity of resource elements according to a resource block pattern, where the first quantity of resource elements is based on one or more orthogonal cover codes associated with the second reference signal, and where one or more frequency tones of the first reference signal align with one or more frequency tones of the second reference signal.

In some examples, to support transmitting the first reference signal, the resource component 950 is capable of, configured to, or operable to support a means for transmitting, in one or more edge resource blocks of the first symbol, the first reference signal, where one or more frequency tones of the first reference signal align with one or more frequency tones of the second reference signal.

In some examples, the resource component 950 is capable of, configured to, or operable to support a means for receiving a control message indicating a quantity of the one or more edge resource blocks.

In some examples, the one or more edge resource blocks of the first symbol are located within a threshold frequency range relative to a frequency boundary of the first shared resources.

In some examples, to support transmitting the first reference signal, the resource component 950 is capable of, configured to, or operable to support a means for transmitting, in the first symbol, the first reference signal in one or more edge resource blocks of the first shared resources in one or more contiguous frequency tones, where the one or more contiguous frequency tones are located within a threshold frequency range relative to a frequency boundary of the first shared resources.

In some examples, the sequence component 955 is capable of, configured to, or operable to support a means for subsampling a type-1 low PAPR sequence associated with the second reference signal, where the first reference signal is transmitted using the subsampled type-1 low PAPR sequence.

In some examples, the sequence component 955 is capable of, configured to, or operable to support a means for generating an initial scrambling seed value for the first reference signal based on a same symbol and a same subframe number associated with the second reference signal.

In some examples, to support transmitting the first reference signal, the sequence component 955 is capable of, configured to, or operable to support a means for transmitting the first reference signal using a subsampled post-DFT binary phase shift keying (BPSK) sequence, where the post-DFT BPSK sequence is a same sequence as the second reference signal.

In some examples, to support transmitting the first reference signal, the sequence component 955 is capable of, configured to, or operable to support a means for transmitting the first reference signal using a type-1 low PAPR sequence, a post-DFT BPSK sequence, or a random QPSK sequence.

In some examples, to support transmitting the first reference signal, the puncturing component 960 is capable of, configured to, or operable to support a means for puncturing the first shared data around the first reference signal after transform precoding.

In some examples, to support transmitting the first reference signal, the resource component 950 is capable of, configured to, or operable to support a means for reducing a quantity of time domain modulation symbols associated with the first shared data in the first symbol. In some examples, to support transmitting the first reference signal, the rate matching component 965 is capable of, configured to, or operable to support a means for performing rate matching around one or more resource elements associated with the first reference signal after transform precoding.

In some examples, the resource component 950 is capable of, configured to, or operable to support a means for reducing a quantity of QAM symbols in a time domain. In some examples, the rate matching component 965 is capable of, configured to, or operable to support a means for performing post-DFT rate matching for the first shared data around the first reference signal.

In some examples, the resource component 950 is capable of, configured to, or operable to support a means for transmitting a quantity of resource elements of the first shared data in a frequency tone that is higher in frequency than a frequency allocation for shared data, lower in frequency than the frequency allocation for shared data, or both based on a quantity of resource elements of the first reference signal. In some examples, the rate matching component 965 is capable of, configured to, or operable to support a means for performing rate matching for the first shared data around the first reference signal.

In some examples, to support transmitting the first reference signal, the rate matching component 965 is capable of, configured to, or operable to support a means for rate matching the first reference signal to one or more resource elements of the first shared data in the first symbol in accordance with a pattern.

In some examples, the first reference signal is a glue reference signal and the second reference signal is a glue reference signal or a DMRS.

Additionally, or alternatively, the communications manager 920 may support wireless communications in accordance with examples as disclosed herein. The DFT-s-OFDM manager 940 is capable of, configured to, or operable to support a means for receiving, via first shared resources and according to a DFT-s-OFDM scheme, a first reference signal multiplexed, in a frequency domain and in a first symbol that is adjacent to and before a phase jump boundary in time, with first shared data. In some examples, the DFT-s-OFDM manager 940 is capable of, configured to, or operable to support a means for receiving, via second shared resources and according to the DFT-s-OFDM scheme, a second reference signal in a second symbol that is adjacent to and after the phase jump boundary. The channel estimation manager 945 is capable of, configured to, or operable to support a means for performing joint channel estimation using a first phase estimate associated with the first symbol and using a second phase estimate associated with the second symbol based on the first reference signal and on the second reference signal.

In some examples, to support receiving the first reference signal, the resource manager 970 is capable of, configured to, or operable to support a means for receiving, in the first symbol, the first reference signal in a first quantity of resource elements according to a resource block pattern, where the first quantity of resource elements is based on one or more orthogonal cover codes associated with the second reference signal, and where one or more frequency tones of the first reference signal align with one or more frequency tones of the second reference signal.

In some examples, to support receiving the first reference signal, the resource manager 970 is capable of, configured to, or operable to support a means for receiving, in one or more edge resource blocks of the first symbol, the first reference signal, where one or more frequency tones of the first reference signal align with one or more frequency tones of the second reference signal.

In some examples, the resource manager 970 is capable of, configured to, or operable to support a means for receiving a control message indicating a quantity of the one or more edge resource blocks.

In some examples, the one or more edge resource blocks of the first symbol are located within a threshold frequency range relative to a frequency boundary of the first shared resources.

In some examples, to support receiving the first reference signal, the resource manager 970 is capable of, configured to, or operable to support a means for receiving, in the first symbol, the first reference signal in one or more edge resource blocks of the first shared resources in one or more contiguous frequency tones, where the one or more contiguous frequency tones are located within a threshold frequency range relative to a frequency boundary of the first shared resources.

In some examples, to support receiving the first reference signal, the sequence manager 975 is capable of, configured to, or operable to support a means for receiving the first reference signal using a subsampled post-DFT BPSK sequence, where the post-DFT BPSK sequence is a same sequence as the second reference signal.

In some examples, to support receiving the first reference signal, the sequence manager 975 is capable of, configured to, or operable to support a means for receiving the first reference signal using a type-1 low PAPR sequence, a post-DFT BPSK sequence, or a random QPSK sequence.

In some examples, the rate matching manager 980 is capable of, configured to, or operable to support a means for receiving a quantity of resource elements of the first shared data in a frequency tone that is higher in frequency than a frequency allocation for shared data, lower in frequency than the frequency allocation for shared data, or both based on a quantity of resource elements of the first reference signal, where the first shared data is rate matched around the first reference signal.

In some examples, the first reference signal is a glue reference signal and the second reference signal is a glue reference signal or a DMRS.

Figure 10:
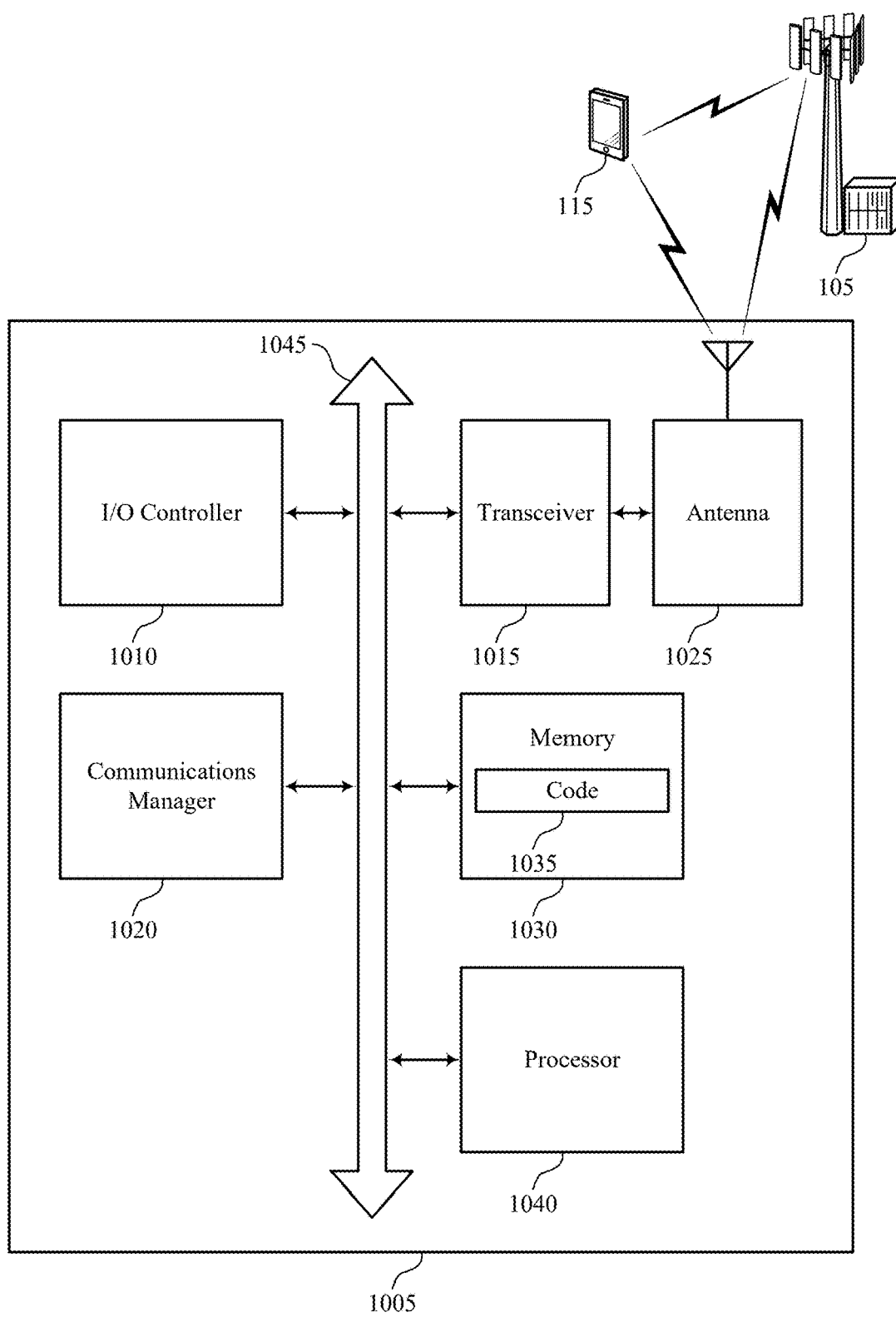
FIG. 10 shows a diagram of a system including a user equipment (UE) that supports glue reference signals for joint channel estimation across a phase jump boundary in accordance with one or more aspects of the present disclosure.

FIG. 10 shows a diagram of a system 1000 including a device 1005 that supports glue reference signals for joint channel estimation across a phase jump boundary in accordance with one or more aspects of the present disclosure. The device 1005 may be an example of or include components of a device 705, a device 805, or a UE 115 as described herein. The device 1005 may communicate (e.g., wirelessly) with one or more other devices (e.g., network entities 105, UEs 115, or a combination thereof). The device 1005 may include components for bi-directional voice and data communications including components for transmitting and receiving communications, such as a communications manager 1020, an input/output (I/O) controller, such as an I/O controller 1010, a transceiver 1015, one or more antennas 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna. However, in some other cases, the device 1005 may have more than one antenna, which may be capable of concurrently transmitting or receiving multiple wireless transmissions. The transceiver 1015 may communicate bi-directionally via the one or more antennas 1025 using wired or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable, or processor-executable code, such as the code 1035. The code 1035 may include instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may include, among other things, a basic I/O system (BIOS) which may control basic hardware or software operation such as the interaction with peripheral components or devices.

The at least one processor 1040 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting glue reference signals for joint channel estimation across a phase jump boundary). For example, the device 1005 or a component of the device 1005 may include at least one processor 1040 and at least one memory 1030 coupled with or to the at least one processor 1040, the at least one processor 1040 and the at least one memory 1030 configured to perform various functions described herein.

In some examples, the at least one processor 1040 may include multiple processors and the at least one memory 1030 may include multiple memories. One or more of the multiple processors may be coupled with one or more of the multiple memories, which may, individually or collectively, be configured to perform various functions described herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code 1035 (e.g., processor-executable code) stored in the at least one memory 1030 or otherwise, to perform one or more of the functions described herein.

The communications manager 1020 may support wireless communications in accordance with examples as disclosed herein. For example, the communications manager 1020 is capable of, configured to, or operable to support a means for multiplexing, in a frequency domain and in a first symbol that is adjacent to and before a phase jump boundary in time, a first reference signal with first shared data in first shared resources. The communications manager 1020 is capable of, configured to, or operable to support a means for mapping, to a second symbol that is adjacent to and after the phase jump boundary in time, a second reference signal associated with second shared resources. The communications manager 1020 is capable of, configured to, or operable to support a means for transmitting, via the first shared resources, the first reference signal multiplexed with the first shared data according to a DFT-s-OFDM scheme. The communications manager 1020 is capable of, configured to, or operable to support a means for transmitting, via the second shared resources, the second reference signal according to the DFT-s-OFDM scheme.

Additionally, or alternatively, the communications manager 1020 may support wireless communications in accordance with examples as disclosed herein. For example, the communications manager 1020 is capable of, configured to, or operable to support a means for receiving, via first shared resources and according to a DFT-s-OFDM scheme, a first reference signal multiplexed, in a frequency domain and in a first symbol that is adjacent to and before a phase jump boundary in time, with first shared data. The communications manager 1020 is capable of, configured to, or operable to support a means for receiving, via second shared resources and according to the DFT-s-OFDM scheme, a second reference signal in a second symbol that is adjacent to and after the phase jump boundary. The communications manager 1020 is capable of, configured to, or operable to support a means for performing joint channel estimation using a first phase estimate associated with the first symbol and using a second phase estimate associated with the second symbol based on the first reference signal and on the second reference signal.

By including or configuring the communications manager 1020 in accordance with examples as described herein, the device 1005 may support techniques for improved communication reliability, improved user experience related to reduced processing, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code

1035 may include instructions executable by the at least one processor 1040 to cause the device 1005 to perform various aspects of glue reference signals for joint channel estimation across a phase jump boundary as described herein, or the at least one processor 1040 and the at least one memory 1030 may be otherwise configured to, individually or collectively, perform or support such operations.

Figure 11:
FIG. 11 shows a diagram of a system including a network entity that supports glue reference signals for joint channel estimation across a phase jump boundary in accordance with one or more aspects of the present disclosure.

FIG. 11 shows a diagram of a system 1100 including a device 1105 that supports glue reference signals for joint channel estimation across a phase jump boundary in accordance with one or more aspects of the present disclosure. The device 1105 may be an example of or include components of a device 705, a device 805, or a network entity 105 as described herein. The device 1105 may communicate with other network devices or network equipment such as one or more of the network entities 105, UEs 115, or any combination thereof. The communications may include communications over one or more wired interfaces, over one or more wireless interfaces, or any combination thereof. The device 1105 may include components that support outputting and obtaining communications, such as a communications manager 1120, a transceiver 1110, one or more antennas 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., communication link(s) 125, backhaul communication link(s) 120, a midhaul communication link 162, a fronthaul communication link 168).

The at least one memory 1125 may include RAM, ROM, or any combination thereof. The at least one memory 1125 may store computer-readable, computer-executable, or processor-executable code, such as the code 1130. The code 1130 may include instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may include, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting glue reference signals for joint channel estimation across a phase jump boundary). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125).

In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. For example, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with one or more other network entities 105, and may include a controller or scheduler for controlling communications with UEs 115 (e.g., in cooperation with the one or more other network devices). In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for multiplexing, in a frequency domain and in a first symbol that is adjacent to and before a phase jump boundary in time, a first reference signal with first shared data in first shared resources. The communications manager 1120 is capable of, configured to, or operable to support a means for mapping, to a second symbol that is adjacent to and after the phase jump boundary in time, a second reference signal associated with second shared resources. The communications manager 1120 is capable of, configured to, or operable to support a means for transmitting, via the first shared resources, the first reference signal multiplexed with the first shared data according to a DFT-s-OFDM scheme. The communications manager 1120 is capable of, configured to, or operable to support a means for transmitting, via the second shared resources, the second reference signal according to the DFT-s-OFDM scheme.

Additionally, or alternatively, the communications manager 1120 may support wireless communications in accordance with examples as disclosed herein. For example, the communications manager 1120 is capable of, configured to, or operable to support a means for receiving, via first shared resources and according to a DFT-s-OFDM scheme, a first reference signal multiplexed, in a frequency domain and in a first symbol that is adjacent to and before a phase jump boundary in time, with first shared data. The communications manager 1120 is capable of, configured to, or operable to support a means for receiving, via second shared resources and according to the DFT-s-OFDM scheme, a second reference signal in a second symbol that is adjacent to and after the phase jump boundary. The communications manager 1120 is capable of, configured to, or operable to support a means for performing joint channel estimation using a first phase estimate associated with the first symbol and using a second phase estimate associated with the second symbol based on the first reference signal and on the second reference signal.

By including or configuring the communications manager 1120 in accordance with examples as described herein, the device 1105 may support techniques for improved communication reliability, improved user experience related to reduced processing, and improved coordination between devices.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of glue reference signals for joint channel estimation across a phase jump boundary as described herein, or the at least one processor 1135 and the at least one memory 1125 may be otherwise configured to, individually or collectively, perform or support such operations.

FIG. 12 shows a flowchart illustrating a method 1200 that supports glue reference signals for joint channel estimation across a phase jump boundary in accordance with one or more aspects of the present disclosure. The operations of the method 1200 may be implemented by a UE or a network entity or its components as described herein. For example, the operations of the method 1200 may be performed by a UE 115 or a network entity as described with reference to FIGS. 1 through 11. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1205, the method may include multiplexing, in a frequency domain and in a first symbol that is adjacent to and before a phase jump boundary in time, a first reference signal with first shared data in first shared resources. The operations of 1205 may be performed in accordance with examples as disclosed herein. In some examples, aspects of the operations of 1205 may be performed by a multiplexing component 925 as described with reference to FIG. 9.

At 1210, the method may include mapping, to a second symbol that is adjacent to and after the phase jump boundary in time, a second reference signal associated with second shared resources. The operations of 1210 may be performed in accordance with examples as disclosed herein. In some examples, aspects of the operations of 1210 may be performed by a mapping component 930 as described with reference to FIG. 9.

At 1215, the method may include transmitting, via the first shared resources, the first reference signal multiplexed with the first shared data according to a DFT-s-OFDM scheme. The operations of 1215 may be performed in accordance with examples as disclosed herein. In some examples, aspects of the operations of 1215 may be performed by a DFT-s-OFDM component 935 as described with reference to FIG. 9.

At 1220, the method may include transmitting, via the second shared resources, the second reference signal according to the DFT-s-OFDM scheme. The operations of 1220 may be performed in accordance with examples as disclosed herein. In some examples, aspects of the operations of 1220 may be performed by a DFT-s-OFDM component 935 as described with reference to FIG. 9.

FIG. 13 shows a flowchart illustrating a method 1300 that supports glue reference signals for joint channel estimation across a phase jump boundary in accordance with one or more aspects of the present disclosure. The operations of the method 1300 may be implemented by a UE or a network entity or its components as described herein. For example, the operations of the method 1300 may be performed by a UE 115 or a network entity as described with reference to FIGS. 1 through 11. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1305, the method may include receiving a control message indicating a quantity of the one or more edge resource blocks. The operations of 1305 may be performed in accordance with examples as disclosed herein. In some examples, aspects of the operations of 1305 may be performed by a resource component 950 as described with reference to FIG. 9.

At 1310, the method may include multiplexing, in a frequency domain and in a first symbol that is adjacent to and before a phase jump boundary in time, a first reference signal with first shared data in first shared resources. The operations of 1310 may be performed in accordance with examples as disclosed herein. In some examples, aspects of the operations of 1310 may be performed by a multiplexing component 925 as described with reference to FIG. 9.

At 1315, the method may include mapping, to a second symbol that is adjacent to and after the phase jump boundary in time, a second reference signal associated with second shared resources. The operations of 1315 may be performed in accordance with examples as disclosed herein. In some examples, aspects of the operations of 1315 may be performed by a mapping component 930 as described with reference to FIG. 9.

At 1320, the method may include transmitting, via the first shared resources, the first reference signal multiplexed with the first shared data according to a DFT-s-OFDM scheme. The operations of 1320 may be performed in accordance with examples as disclosed herein. In some examples, aspects of the operations of 1320 may be performed by a DFT-s-OFDM component 935 as described with reference to FIG. 9.

At 1325, the method may include transmitting, in one or more edge resource blocks of the first symbol, the first reference signal, where one or more frequency tones of the first reference signal align with one or more frequency tones of the second reference signal. The operations of 1325 may be performed in accordance with examples as disclosed herein. In some examples, aspects of the operations of 1325 may be performed by a resource component 950 as described with reference to FIG. 9.

At 1330, the method may include transmitting, via the second shared resources, the second reference signal according to the DFT-s-OFDM scheme. The operations of 1330 may be performed in accordance with examples as disclosed herein. In some examples, aspects of the operations of 1330 may be performed by a DFT-s-OFDM component 935 as described with reference to FIG. 9.

FIG. 14 shows a flowchart illustrating a method 1400 that supports glue reference signals for joint channel estimation across a phase jump boundary in accordance with one or more aspects of the present disclosure. The operations of the method 1400 may be implemented by a UE or a network entity or its components as described herein. For example, the operations of the method 1400 may be performed by a UE 115 or a network entity as described with reference to FIGS. 1 through 11. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1405, the method may include receiving, via first shared resources and according to a DFT-s-OFDM scheme, a first reference signal multiplexed, in a frequency domain and in a first symbol that is adjacent to and before a phase jump boundary in time, with first shared data. The operations of 1405 may be performed in accordance with examples as disclosed herein. In some examples, aspects of the operations of 1405 may be performed by a DFT-s-OFDM manager 940 as described with reference to FIG. 9.

At 1410, the method may include receiving, via second shared resources and according to the DFT-s-OFDM scheme, a second reference signal in a second symbol that is adjacent to and after the phase jump boundary. The operations of 1410 may be performed in accordance with examples as disclosed herein. In some examples, aspects of the operations of 1410 may be performed by a DFT-s-OFDM manager 940 as described with reference to FIG. 9.

At 1415, the method may include performing joint channel estimation using a first phase estimate associated with the first symbol and using a second phase estimate associated with the second symbol based on the first reference signal and on the second reference signal. The operations of 1415 may be performed in accordance with examples as disclosed herein. In some examples, aspects of the operations of 1415 may be performed by a channel estimation manager 945 as described with reference to FIG. 9.

FIG. 15 shows a flowchart illustrating a method 1500 that supports glue reference signals for joint channel estimation across a phase jump boundary in accordance with one or more aspects of the present disclosure. The operations of the method 1500 may be implemented by a UE or a network entity or its components as described herein. For example, the operations of the method 1500 may be performed by a UE 115 or a network entity as described with reference to FIGS. 1 through 11. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1505, the method may include receiving a control message indicating a quantity of the one or more edge resource blocks. The operations of 1505 may be performed in accordance with examples as disclosed herein. In some examples, aspects of the operations of 1505 may be performed by a resource manager 970 as described with reference to FIG. 9.

At 1510, the method may include receiving, via first shared resources and according to a DFT-s-OFDM scheme, a first reference signal multiplexed, in a frequency domain and in a first symbol that is adjacent to and before a phase jump boundary in time, with first shared data. The operations of 1510 may be performed in accordance with examples as disclosed herein. In some examples, aspects of the operations of 1510 may be performed by a DFT-s-OFDM manager 940 as described with reference to FIG. 9.

At 1515, the method may include receiving, in one or more edge resource blocks of the first symbol, the first reference signal, where one or more frequency tones of the first reference signal align with one or more frequency tones of the second reference signal. The operations of 1515 may be performed in accordance with examples as disclosed herein. In some examples, aspects of the operations of 1515 may be performed by a resource manager 970 as described with reference to FIG. 9.

At 1520, the method may include receiving, via second shared resources and according to the DFT-s-OFDM scheme, a second reference signal in a second symbol that is adjacent to and after the phase jump boundary. The operations of 1520 may be performed in accordance with examples as disclosed herein. In some examples, aspects of the operations of 1520 may be performed by a DFT-s-OFDM manager 940 as described with reference to FIG. 9.

At 1525, the method may include performing joint channel estimation using a first phase estimate associated with the first symbol and using a second phase estimate associated with the second symbol based on the first reference signal and on the second reference signal. The operations of 1525 may be performed in accordance with examples as disclosed herein. In some examples, aspects of the operations of 1525 may be performed by a channel estimation manager 945 as described with reference to FIG. 9.

The following aspects are given by way of illustration. Examples of the following aspects may be combined with examples or embodiments shown or discussed in relation to the figures or elsewhere herein.

Aspect 1: A method for wireless communications at a wireless device, comprising: multiplexing, in a frequency domain and in a first symbol that is adjacent to and before a phase jump boundary in time, a first reference signal with first shared data in first shared resources; mapping, to a second symbol that is adjacent to and after the phase jump boundary in time, a second reference signal associated with second shared resources; transmitting, via the first shared resources, the first reference signal multiplexed with the first shared data according to a discrete Fourier transform-spread-orthogonal frequency division multiplexing (DFT-s-OFDM) scheme; and transmitting, via the second shared resources, the second reference signal according to the DFT-s-OFDM scheme.

Aspect 2: The method of aspect 1, wherein transmitting the first reference signal comprises: transmitting, in the first symbol, the first reference signal in a first quantity of resource elements according to a resource block pattern, wherein the first quantity of resource elements is based at least in part on one or more orthogonal cover codes associated with the second reference signal, and wherein one or more frequency tones of the first reference signal align with one or more frequency tones of the second reference signal.

Aspect 3: The method of any of aspects 1 through 2, wherein transmitting the first reference signal comprises: transmitting, in one or more edge resource blocks of the first symbol, the first reference signal, wherein one or more frequency tones of the first reference signal align with one or more frequency tones of the second reference signal.

Aspect 4: The method of aspect 3, further comprising: receiving a control message indicating a quantity of the one or more edge resource blocks.

Aspect 5: The method of any of aspects 3 through 4, wherein the one or more edge resource blocks of the first symbol are located within a threshold frequency range relative to a frequency boundary of the first shared resources.

Aspect 6: The method of any of aspects 1 through 5, wherein transmitting the first reference signal comprises: transmitting, in the first symbol, the first reference signal in one or more edge resource blocks of the first shared resources in one or more contiguous frequency tones, wherein the one or more contiguous frequency tones are located within a threshold frequency range relative to a frequency boundary of the first shared resources.

Aspect 7: The method of any of aspects 1 through 6, further comprising: subsampling a type-1 low peak-to-average-power-ratio (PAPR) sequence associated with the second reference signal, wherein the first reference signal is transmitted using the subsampled type-1 low PAPR sequence.

Aspect 8: The method of aspect 7, further comprising: generating an initial scrambling seed value for the first reference signal based at least in part on a same symbol and a same subframe number associated with the second reference signal.

Aspect 9: The method of any of aspects 1 through 8, wherein transmitting the first reference signal comprises: transmitting the first reference signal using a subsampled post-DFT binary phase shift keying (BPSK) sequence, wherein the post-DFT BPSK sequence is a same sequence as the second reference signal.

Aspect 10: The method of any of aspects 1 through 9, wherein transmitting the first reference signal comprises: transmitting the first reference signal using a type-1 low peak-to-average-power-ratio (PAPR) sequence, a post-DFT binary phase shift keying (BPSK) sequence, or a random quadrature phase shift keying (QPSK) sequence.

Aspect 11: The method of any of aspects 1 through 10, wherein transmitting the first reference signal comprises: puncturing the first shared data around the first reference signal after transform precoding.

Aspect 12: The method of any of aspects 1 through 10, wherein transmitting the first reference signal further comprises: reducing a quantity of time domain modulation symbols associated with the first shared data in the first symbol; and performing rate matching around one or more resource elements associated with the first reference signal after transform precoding.

Aspect 13: The method of aspect 12, further comprising: reducing a quantity of quadrature amplitude modulation (QAM) symbols in a time domain; and performing post-DFT rate matching for the first shared data around the first reference signal.

Aspect 14: The method of any of aspects 12 through 13, further comprising: transmitting a quantity of resource elements of the first shared data in a frequency tone that is higher in frequency than a frequency allocation for shared data, lower in frequency than the frequency allocation for shared data, or both based at least in part on a quantity of resource elements of the first reference signal; and performing rate matching for the first shared data around the first reference signal.

Aspect 15: The method of any of aspects 1 through 10, wherein transmitting the first reference signal comprises: rate matching the first reference signal to one or more resource elements of the first shared data in the first symbol in accordance with a pattern.

Aspect 16: The method of any of aspects 1 through 15, wherein the first reference signal is a glue reference signal and the second reference signal is a glue reference signal or a DMRS.

Aspect 17: A method for wireless communications at a wireless device, comprising: receiving, via first shared resources and according to a discrete Fourier transform-spread-orthogonal frequency division multiplexing (DFT-s-OFDM) scheme, a first reference signal multiplexed, in a frequency domain and in a first symbol that is adjacent to and before a phase jump boundary in time, with first shared data; receiving, via second shared resources and according to the DFT-s-OFDM scheme, a second reference signal in a second symbol that is adjacent to and after the phase jump boundary; and performing joint channel estimation using a first phase estimate associated with the first symbol and using a second phase estimate associated with the second symbol based at least in part on the first reference signal and on the second reference signal.

Aspect 18: The method of aspect 17, wherein receiving the first reference signal further comprises: receiving, in the first symbol, the first reference signal in a first quantity of resource elements according to a resource block pattern, wherein the first quantity of resource elements is based at least in part on one or more orthogonal cover codes associated with the second reference signal, and wherein one or more frequency tones of the first reference signal align with one or more frequency tones of the second reference signal.

Aspect 19: The method of any of aspects 17 through 18, wherein receiving the first reference signal comprises: receiving, in one or more edge resource blocks of the first symbol, the first reference signal, wherein one or more frequency tones of the first reference signal align with one or more frequency tones of the second reference signal.

Aspect 20: The method of aspect 19, further comprising: receiving a control message indicating a quantity of the one or more edge resource blocks.

Aspect 21: The method of any of aspects 19 through 20, wherein the one or more edge resource blocks of the first symbol are located within a threshold frequency range relative to a frequency boundary of the first shared resources.

Aspect 22: The method of any of aspects 17 through 21, wherein receiving the first reference signal comprises: receiving, in the first symbol, the first reference signal in one or more edge resource blocks of the first shared resources in one or more contiguous frequency tones, wherein the one or more contiguous frequency tones are located within a threshold frequency range relative to a frequency boundary of the first shared resources.

Aspect 23: The method of any of aspects 17 through 22, wherein receiving the first reference signal comprises: receiving the first reference signal using a subsampled post-DFT binary phase shift keying (BPSK) sequence, wherein the post-DFT BPSK sequence is a same sequence as the second reference signal.

Aspect 24: The method of any of aspects 17 through 23, wherein receiving the first reference signal further comprises: receiving the first reference signal using a type-1 low peak-to-average-power-ratio (PAPR) sequence, a post-DFT binary phase shift keying (BPSK) sequence, or a random quadrature phase shift keying (QPSK) sequence.

Aspect 25: The method of any of aspects 17 through 24, further comprising: receiving a quantity of resource elements of the first shared data in a frequency tone that is higher in frequency than a frequency allocation for shared data, lower in frequency than the frequency allocation for shared data, or both based at least in part on a quantity of resource elements of the first reference signal, wherein the first shared data is rate matched around the first reference signal.

Aspect 26: The method of any of aspects 17 through 25, wherein the first reference signal is a glue reference signal and the second reference signal is a glue reference signal or a DMRS.

Aspect 27: A wireless device for wireless communications, comprising one or more memories storing processor-executable code, and one or more processors coupled with the one or more memories and individually or collectively operable to execute the code to cause the wireless device to perform a method of any of aspects 1 through 16.

Aspect 28: A wireless device for wireless communications, comprising at least one means for performing a method of any of aspects 1 through 16.

Aspect 29: A non-transitory computer-readable medium storing code for wireless communications, the code comprising instructions executable by one or more processors to perform a method of any of aspects 1 through 16.

Aspect 30: A wireless device for wireless communications, comprising one or more memories storing processor-executable code, and one or more processors coupled with the one or more memories and individually or collectively operable to execute the code to cause the wireless device to perform a method of any of aspects 17 through 26.

Aspect 31: A wireless device for wireless communications, comprising at least one means for performing a method of any of aspects 17 through 26.

Aspect 32: A non-transitory computer-readable medium storing code for wireless communications, the code comprising instructions executable by one or more processors to perform a method of any of aspects 17 through 26.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless device, comprising:
one or more memories storing processor-executable code; and
one or more processors coupled with the one or more memories and individually or collectively operable to execute the code to cause the wireless device to:
multiplex, in a frequency domain and in a first symbol that is adjacent to and before a phase jump boundary in time, a first reference signal with first shared data in first shared resources;
map, to a second symbol that is adjacent to and after the phase jump boundary in time, a second reference signal associated with second shared resources;
transmit, via the first shared resources, the first reference signal multiplexed with the first shared data according to a discrete Fourier transform-spread-orthogonal frequency division multiplexing (DFT-s-OFDM) scheme; and
transmit, via the second shared resources, the second reference signal according to the DFT-s-OFDM scheme.

2. The wireless device of claim 1, wherein, to transmit the first reference signal, the one or more processors are individually or collectively operable to execute the code to cause the wireless device to:
transmit, in the first symbol, the first reference signal in a first quantity of resource elements according to a resource block pattern, wherein the first quantity of resource elements is based at least in part on one or more orthogonal cover codes associated with the second reference signal, and wherein one or more frequency tones of the first reference signal align with one or more frequency tones of the second reference signal.

3. The wireless device of claim 1, wherein, to transmit the first reference signal, the one or more processors are individually or collectively operable to execute the code to cause the wireless device to:

transmit, in one or more edge resource blocks of the first symbol, the first reference signal, wherein one or more frequency tones of the first reference signal align with one or more frequency tones of the second reference signal.

4. The wireless device of claim 3, wherein the one or more processors are individually or collectively further operable to execute the code to cause the wireless device to:

receive a control message indicating a quantity of the one or more edge resource blocks.

5. The wireless device of claim 3, wherein the one or more edge resource blocks of the first symbol are located within a threshold frequency range relative to a frequency boundary of the first shared resources.

6. The wireless device of claim 1, wherein, to transmit the first reference signal, the one or more processors are individually or collectively operable to execute the code to cause the wireless device to:

transmit, in the first symbol, the first reference signal in one or more edge resource blocks of the first shared resources in one or more contiguous frequency tones, wherein the one or more contiguous frequency tones are located within a threshold frequency range relative to a frequency boundary of the first shared resources.

7. The wireless device of claim 1, wherein the one or more processors are individually or collectively further operable to execute the code to cause the wireless device to:

subsample a type-1 low peak-to-average-power-ratio (PAPR) sequence associated with the second reference signal, wherein the first reference signal is transmitted using the subsampled type-1 low PAPR sequence.

8. The wireless device of claim 7, wherein the one or more processors are individually or collectively further operable to execute the code to cause the wireless device to:

generate an initial scrambling seed value for the first reference signal based at least in part on a same symbol and a same subframe number associated with the second reference signal.

9. The wireless device of claim 1, wherein, to transmit the first reference signal, the one or more processors are individually or collectively operable to execute the code to cause the wireless device to:

transmit the first reference signal using a subsampled post-DFT binary phase shift keying (BPSK) sequence, wherein the post-DFT BPSK sequence is a same sequence as the second reference signal.

10. The wireless device of claim 1, wherein, to transmit the first reference signal, the one or more processors are individually or collectively operable to execute the code to cause the wireless device to:

transmit the first reference signal using a type-1 low peak-to-average-power-ratio (PAPR) sequence, a post-DFT binary phase shift keying (BPSK) sequence, or a random quadrature phase shift keying (QPSK) sequence.

11. The wireless device of claim 1, wherein, to transmit the first reference signal, the one or more processors are individually or collectively operable to execute the code to cause the wireless device to:

puncture the first shared data around the first reference signal after transform precoding.

12. The wireless device of claim 1, wherein, to transmit the first reference signal, the one or more processors are individually or collectively further operable to execute the code to cause the wireless device to:

reduce a quantity of time domain modulation symbols associated with the first shared data in the first symbol; and perform rate matching around one or more resource elements associated with the first reference signal after transform precoding.

13. The wireless device of claim 12, wherein the one or more processors are individually or collectively further operable to execute the code to cause the wireless device to:

reduce a quantity of quadrature amplitude modulation (QAM) symbols in a time domain; and perform post-DFT rate matching for the first shared data around the first reference signal.

14. The wireless device of claim 12, wherein the one or more processors are individually or collectively further operable to execute the code to cause the wireless device to:

transmit a quantity of resource elements of the first shared data in a frequency tone that is higher in frequency than a frequency allocation for shared data, lower in frequency than the frequency allocation for shared data, or both based at least in part on a quantity of resource elements of the first reference signal; and perform rate matching for the first shared data around the first reference signal.

15. The wireless device of claim 1, wherein, to transmit the first reference signal, the one or more processors are individually or collectively operable to execute the code to cause the wireless device to:

rate match the first reference signal to one or more resource elements of the first shared data in the first symbol in accordance with a pattern.

16. The wireless device of claim 1, wherein the first reference signal is a glue reference signal and the second reference signal is a glue reference signal or a demodulation reference signal (DMRS).

17. A wireless device, comprising:

one or more memories storing processor-executable code; and one or more processors coupled with the one or more memories and individually or collectively operable to execute the code to cause the wireless device to:

receive, via first shared resources and according to a discrete Fourier transform-spread-orthogonal frequency division multiplexing (DFT-s-OFDM) scheme, a first reference signal multiplexed, in a frequency domain and in a first symbol that is adjacent to and before a phase jump boundary in time, with first shared data;

receive, via second shared resources and according to the DFT-s-OFDM scheme, a second reference signal in a second symbol that is adjacent to and after the phase jump boundary; and perform joint channel estimation using a first phase estimate associated with the first symbol and using a second phase estimate associated with the second symbol based at least in part on the first reference signal and on the second reference signal.

18. The wireless device of claim 17, wherein, to receive the first reference signal, the one or more processors are individually or collectively further operable to execute the code to cause the wireless device to:

receive, in the first symbol, the first reference signal in a first quantity of resource elements according to a resource block pattern, wherein the first quantity of resource elements is based at least in part on one or more orthogonal cover codes associated with the second reference signal, and wherein one or more frequency tones of the first reference signal align with one or more frequency tones of the second reference signal.

19. The wireless device of claim 17, wherein, to receive the first reference signal, the one or more processors are individually or collectively operable to execute the code to cause the wireless device to:

receive, in one or more edge resource blocks of the first symbol, the first reference signal, wherein one or more frequency tones of the first reference signal align with one or more frequency tones of the second reference signal.

20. The wireless device of claim 19, wherein the one or more processors are individually or collectively further operable to execute the code to cause the wireless device to:

receive a control message indicating a quantity of the one or more edge resource blocks.

21. The wireless device of claim 19, wherein the one or more edge resource blocks of the first symbol are located within a threshold frequency range relative to a frequency boundary of the first shared resources.

22. The wireless device of claim 17, wherein, to receive the first reference signal, the one or more processors are individually or collectively operable to execute the code to cause the wireless device to:

receive, in the first symbol, the first reference signal in one or more edge resource blocks of the first shared resources in one or more contiguous frequency tones, wherein the one or more contiguous frequency tones are located within a threshold frequency range relative to a frequency boundary of the first shared resources.

23. The wireless device of claim 17, wherein, to receive the first reference signal, the one or more processors are individually or collectively operable to execute the code to cause the wireless device to:

receive the first reference signal using a subsampled post-DFT binary phase shift keying (BPSK) sequence, wherein the post-DFT BPSK sequence is a same sequence as the second reference signal.

24. The wireless device of claim 17, wherein, to receive the first reference signal, the one or more processors are individually or collectively further operable to execute the code to cause the wireless device to:

receive the first reference signal using a type-1 low peak-to-average-power-ratio (PAPR) sequence, a post-DFT binary phase shift keying (BPSK) sequence, or a random quadrature phase shift keying (QPSK) sequence.

25. The wireless device of claim 17, wherein the one or more processors are individually or collectively further operable to execute the code to cause the wireless device to:

receive a quantity of resource elements of the first shared data in a frequency tone that is higher in frequency than a frequency allocation for shared data, lower in frequency than the frequency allocation for shared data, or both based at least in part on a quantity of resource elements of the first reference signal, wherein the first shared data is rate matched around the first reference signal.

26. The wireless device of claim 17, wherein the first reference signal is a glue reference signal and the second reference signal is a glue reference signal or a demodulation reference signal (DMRS).

27. A method for wireless communications at a wireless device, comprising:

multiplexing, in a frequency domain and in a first symbol that is adjacent to and before a phase jump boundary in time, a first reference signal with first shared data in first shared resources;

mapping, to a second symbol that is adjacent to and after the phase jump boundary in time, a second reference signal associated with second shared resources;

transmitting, via the first shared resources, the first reference signal multiplexed with the first shared data according to a discrete Fourier transform-spread-orthogonal frequency division multiplexing (DFT-s-OFDM) scheme; and transmitting, via the second shared resources, the second reference signal according to the DFT-s-OFDM scheme.

28. The method of claim 27, wherein transmitting the first reference signal comprises:

transmitting, in one or more edge resource blocks of the first symbol, the first reference signal, wherein one or more frequency tones of the first reference signal align with one or more frequency tones of the second reference signal.

29. A method for wireless communications at a wireless device, comprising:

receiving, via first shared resources and according to a discrete Fourier transform-spread-orthogonal frequency division multiplexing (DFT-s-OFDM) scheme, a first reference signal multiplexed, in a frequency domain and in a first symbol that is adjacent to and before a phase jump boundary in time, with first shared data;

receiving, via second shared resources and according to the DFT-s-OFDM scheme, a second reference signal in a second symbol that is adjacent to and after the phase jump boundary; and performing joint channel estimation using a first phase estimate associated with the first symbol and using a second phase estimate associated with the second symbol based at least in part on the first reference signal and on the second reference signal.

30. The method of claim 29, wherein receiving the first reference signal comprises:

receiving, in one or more edge resource blocks of the first symbol, the first reference signal, wherein one or more frequency tones of the first reference signal align with one or more frequency tones of the second reference signal.

\* \* \* \* \*